United States Patent
Ouderkirk et al.

(10) Patent No.: US 12,472,711 B2
(45) Date of Patent: Nov. 18, 2025

(54) OPTICAL SYSTEM

(71) Applicant: 3M INNOVATIVE PROPERTIES COMPANY, St. Paul, MN (US)

(72) Inventors: Andrew J. Ouderkirk, Kirkland, WA (US); Zhisheng Yun, Sammamish, WA (US); Timothy L. Wong, St. Paul, MN (US); Erin A. McDowell, Afton, MN (US); Jo A. Etter, Kirkland, WA (US); Robert M. Jennings, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1734 days.

(21) Appl. No.: 16/718,385

(22) Filed: Dec. 18, 2019

(65) Prior Publication Data
US 2020/0124856 A1 Apr. 23, 2020

Related U.S. Application Data

(63) Continuation of application No. 15/754,002, filed as application No. PCT/US2016/050024 on Sep. 2, 2016, now Pat. No. 10,564,427.
(Continued)

(51) Int. Cl.
*G02B 27/28* (2006.01)
*B29D 11/00* (2006.01)
(Continued)

(52) U.S. Cl.
CPC .......... *B29D 11/00644* (2013.01); *G02B 5/30* (2013.01); *G02B 5/3041* (2013.01);
(Continued)

(58) Field of Classification Search
CPC ............ G02B 27/0172; G02B 13/0065; G02B 5/305; G02B 2027/013; G02B 1/041;
(Continued)

(56) References Cited

U.S. PATENT DOCUMENTS

| | | | |
|---|---|---|---|
| 5,333,072 A | 7/1994 | Willett | |
| 5,926,321 A | 7/1999 | Shikama | |

(Continued)

FOREIGN PATENT DOCUMENTS

| | | |
|---|---|---|
| CN | 1313958 | 9/2001 |
| CN | 1315008 | 9/2001 |

(Continued)

OTHER PUBLICATIONS

Fess, "Freeform Optics: The Next Generation of Precision Optical Components", OptiPro System—Laser Focus World Webinar, Sep. 2012, pp. 1-35.

(Continued)

*Primary Examiner* — Balram T Parbadia
(74) *Attorney, Agent, or Firm* — Clifton F. Richardson

(57) ABSTRACT

An optical system including at least a first lens, a partial reflector and a reflective polarizer is described. The optical system has an optical axis such that a light ray propagating along the optical axis passes through the first lens the partial reflector and the reflective polarizer without being substantially refracted. At least one major surface of the optical system is rotationally asymmetric about the optical axis. A major surface of the optical system may have a first portion defined by a first equation and a second portion adjacent the first portion defined by a different equation. The first lens may have a contoured edge adapted to be placed adjacent an eye of a viewer and substantially conform to the viewer's face.

13 Claims, 18 Drawing Sheets

Related U.S. Application Data

(60) Provisional application No. 62/214,049, filed on Sep. 3, 2015.

(51) Int. Cl.
| | |
|---|---|
| *G02B 5/30* | (2006.01) |
| *G02B 13/00* | (2006.01) |
| *G02B 17/08* | (2006.01) |
| *G02B 27/00* | (2006.01) |
| *G02B 27/01* | (2006.01) |
| *G02B 27/09* | (2006.01) |
| *G02B 27/14* | (2006.01) |
| *G03B 21/28* | (2006.01) |

(52) U.S. Cl.
CPC .......... *G02B 5/305* (2013.01); *G02B 5/3058* (2013.01); *G02B 5/3066* (2013.01); *G02B 5/3083* (2013.01); *G02B 13/0055* (2013.01); *G02B 17/0804* (2013.01); *G02B 17/0856* (2013.01); *G02B 27/0068* (2013.01); *G02B 27/0081* (2013.01); *G02B 27/0172* (2013.01); *G02B 27/0905* (2013.01); *G02B 27/0983* (2013.01); *G02B 27/144* (2013.01); *G02B 27/145* (2013.01); *G02B 27/148* (2013.01); *G02B 27/283* (2013.01); *G02B 27/286* (2013.01); *G03B 21/28* (2013.01); *G02B 17/0896* (2013.01); *G02B 2027/011* (2013.01); *G02B 2027/013* (2013.01); *G02B 2027/0138* (2013.01)

(58) Field of Classification Search
CPC .......... G02B 13/0055; G02B 17/0804; G02B 17/0856; G02B 21/04; G02B 21/28; G02B 23/2407; G02B 27/0068; G02B 27/0081; G02B 27/0093; G02B 27/0176; G02B 27/0905; G02B 27/0983; G02B 27/144; G02B 27/145; G02B 27/148; G02B 27/22; G02B 27/2228; G02B 27/2235; G02B 27/2242; G02B 27/283; G02B 27/286; G02B 5/005; G02B 5/04; G02B 5/0891; G02B 5/3025; G02B 5/3041; G02B 5/3058; G02B 5/3066; G02B 5/3075; G02B 5/3083; G02B 5/3091; G02B 17/0896; G02B 2027/011; G02B 2027/0134; G02B 2027/0138; G02B 2027/0154; G02B 27/28; G02B 27/30; B29C 45/14; B29C 55/04; B29D 11/00644; B29D 11/0073; B29D 11/00865; G02C 7/081; G02C 7/02; G03B 21/00; G03B 21/28; G06F 3/013; H05K 999/99; B29K 2069/00; B29K 2995/003; B29K 2995/0034; B29L 2009/00; B29L 2011/00

See application file for complete search history.

(56) References Cited

U.S. PATENT DOCUMENTS

| | | |
|---|---|---|
| 5,966,242 A | 10/1999 | Yamanaka |
| 5,986,812 A | 11/1999 | Takahashi |
| 6,075,651 A | 6/2000 | Hoppe |
| 6,094,242 A | 7/2000 | Yamanaka |
| 6,406,150 B1 | 6/2002 | Burstyn |
| 6,421,183 B1 | 7/2002 | Ophey |
| 6,788,463 B2 | 9/2004 | Merrill |
| 2002/0015114 A1 | 2/2002 | Okuyama |
| 2002/0024743 A1 | 2/2002 | Endo |
| 2002/0060851 A1 | 5/2002 | Yamazaki |
| 2006/0256288 A1 | 11/2006 | De Vaan |
| 2007/0273970 A1 | 11/2007 | Hoppe et al. |
| 2012/0057122 A1 | 3/2012 | Guillot et al. |
| 2014/0049831 A1 | 2/2014 | Takeda |
| 2014/0177017 A1 | 6/2014 | Kubota et al. |
| 2014/0225813 A1 | 8/2014 | Komatsu et al. |
| 2014/0268007 A1 | 9/2014 | Ben-Shahar |
| 2014/0340285 A1 | 11/2014 | Hiraide |
| 2015/0185480 A1 | 7/2015 | Ouderkirk |
| 2015/0379697 A1* | 12/2015 | Pohl .................. G02B 27/0172 359/630 |
| 2016/0070103 A1 | 3/2016 | Yoon |
| 2017/0017077 A1 | 1/2017 | Tang et al. |

FOREIGN PATENT DOCUMENTS

| | | |
|---|---|---|
| CN | 1922528 | 2/2007 |
| CN | 101048693 | 10/2007 |
| CN | 102053368 | 5/2011 |
| EP | 0922985 | 6/1999 |
| GB | 2274727 | 8/1994 |
| GB | 2387920 | 10/2003 |
| JP | 2008-152019 | 7/2008 |
| JP | 2012-234074 | 11/2012 |
| JP | 2015-151472 | 2/2014 |
| KR | 0136641 | 2/1999 |
| WO | WO 1994-07161 | 3/1994 |
| WO | WO 1996-19347 | 6/1996 |
| WO | WO 99/40470 | 8/1999 |
| WO | WO 2000-70386 | 11/2000 |
| WO | WO 2001-02893 | 1/2001 |
| WO | WO 2011-091314 | 7/2011 |
| WO | WO 2012-140503 | 10/2012 |
| WO | WO 2017-039714 | 3/2017 |
| WO | WO 2017-213912 | 12/2017 |
| WO | WO 2017-213913 | 12/2017 |

OTHER PUBLICATIONS

Hochheiser, "The FaceBase Consortium: a comprehensive program to facilitate craniofacial research", Developmental Biology, Jul. 2011, vol. 355, No. 2, pp. 175-182.

International Search Report for PCT International Application No. PCT/US2016/050024, mailed on Mar. 22, 2017, 9 pages.

\* cited by examiner

OPTICAL SYSTEM

BACKGROUND

Optical systems may be included in a head-mounted display to provide images to a viewer. The optical system may include a display panel and various optical components between the display panel and an eye of the viewer.

SUMMARY

In some aspects of the present description, an optical system including a first lens, a second lens, a partial reflector, and a reflective polarizer is provided. At least one of the first and second lenses have optical power in two mutually orthogonal directions. The partial reflector has an average optical reflectance of at least 30% for at least one desired wavelength. The reflective polarizer substantially transmits light having a first polarization state and substantially reflects light having an orthogonal second polarization state. The optical system has an optical axis such that a light ray propagating along the optical axis passes through the first lens, the second lens, the partial reflector and the reflective polarizer without being substantially refracted. In some embodiments, at least one major surface of the optical system is rotationally asymmetric about the optical axis. In some embodiments, at least one of the first lens, the second lens, the partial reflector and the reflective polarizer comprises at least one plane of asymmetry comprising the optical axis. In some embodiments, the optical system is rotationally symmetric about the optical axis with respect to light rays incident on the optical system and making a smaller first, but not a greater second, incident angle with the optical axis and wherein for each of the first and second incident angles, a plurality of incident light rays pass through the first lens, the second lens, the partial reflector and the reflective polarizer.

In some aspects of the present description, an optical system including a first lens, a partial reflector, and a reflective polarizer is provided. The partial reflector has an average optical reflectance of at least 30% for at least one desired wavelength. The reflective polarizer substantially transmits light having a first polarization state and substantially reflects light having an orthogonal second polarization state. The optical system has an optical axis such that a light ray propagating along the optical axis passes through the first lens, the partial reflector and the reflective polarizer without being substantially refracted. The first lens has opposing first and second major surfaces defined by respective different first and second equations. Each equation, but not each major surface, is rotationally symmetric about the optical axis.

In some aspects of the present description, an optical system including a first lens having optical power in two mutually orthogonal directions, a partial reflector, and a reflective polarizer is provided. The partial reflector has an average optical reflectance of at least 30% for at least one desired wavelength. The reflective polarizer substantially transmits light having a first polarization state and substantially reflects light having an orthogonal second polarization state. The optical system has an optical axis such that a light ray propagating along the optical axis passes through the first lens, the partial reflector and the reflective polarizer without being substantially refracted. The first lens has opposing first and second major surfaces, each major surface having a first portion defined by a first equation and a second portion adjacent the first portion defined by a different second equation. The first and second equations for each major surface are rotationally symmetric about the optical axis.

In some aspects of the present description, an optical system for displaying an image to a viewer is provided. The optical system includes a first lens having optical power in two mutually orthogonal directions; a partial reflector having an average optical reflectance of at least 30% for at least one desired wavelength; and a reflective polarizer substantially transmitting light having a first polarization state and substantially reflecting light having an orthogonal second polarization state. The first lens has a contoured edge adapted to be placed adjacent an eye of a viewer and substantially conform to the viewer's face.

In some aspects of the present description, a head-mounted display system is provided. The head-mounted display system includes a display emitting an image for viewing by an eye of a viewer; a first lens; a partial reflector having an average optical reflectance of at least 30% for at least one desired wavelength; and a reflective polarizer substantially transmitting light having a first polarization state and substantially reflecting light having an orthogonal second polarization state. The optical system has an optical axis such that a first image ray emitted by the display propagating along the optical axis passes through the first lens, the partial reflector and the reflective polarizer without being substantially refracted and passes through a pupil of the eye of the viewer. At least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point. The display is disposed between the intersection point and the eye of the viewer.

In some aspects of the present description, an optical system including a first lens; a partial reflector having an average optical reflectance of at least 30% for at least one desired wavelength; and a reflective polarizer substantially transmitting light having a first polarization state and substantially reflecting light having an orthogonal second polarization state is provided. The optical system has an optical axis such that a light ray propagating along the optical axis passes through the first lens, the partial reflector and the reflective polarizer without being substantially refracted. For at least one major surface of the optical system, the major surface has no surface portion that is rotationally symmetric about the optical axis.

In some aspects of the present description, a method of making a custom optical stack is provided. The method includes measuring facial contours of the viewer; and providing a first lens which has a contoured edge adapted to be placed adjacent an eye of the viewer and substantially conform to the measured facial contours of the viewer. The optical stack includes a reflective polarizer substantially transmitting light having a first polarization state and substantially reflecting light having an orthogonal second polarization state. The reflective polarizer is disposed on a major surface of the first lens.

In some aspects of the present description, an optical system including a first lens; a partial reflector having an average optical reflectance of at least 30% for at least one desired wavelength; and a reflective polarizer substantially transmitting light having a first polarization state and substantially reflecting light having an orthogonal second polarization state. For at least one major surface of the optical system, a largest correlation coefficient between any polynomial of degree n, n greater than zero, fitted to the at least one major surface using a least squares fit is less than 0.95.

In some aspects of the present description, a lens including a lens substrate having opposing first and second major surfaces and a film having anisotropic mechanical properties disposed on one of the first and second major surfaces is provided. The film has a first axis aligned with a major axis of the lens substrate. The lens has optical power in two mutually orthogonal directions and the lens is not rotationally symmetric about any axis.

In some aspects of the present description, a lens including a lens substrate and a film having anisotropic mechanical properties disposed on a major surface of the lens substrate is provided. The lens has a principle axis. The major surface has a first maximum sag at a first radius in a first direction from the principle axis and a second maximum sag at a second radius in a second direction from the principle axis. The first direction is along a first axis orthogonal to the principle axis, and the second direction is along a second axis orthogonal to both the principle axis and the first axis. A first ratio of the first maximum sag to the first radius is at least 1.05 times a second ratio of the second maximum sag to the second radius. The second ratio is at least 0.1. The film has a film axis aligned in a predetermined way relative to the first axis or the second axis.

In some aspects of the present description, a shaped optical film having anisotropic mechanical properties is provided. The shaped optical film has a projected area in a first plane with the shaped optical film being disposed on one side of the first plane. The first plane being such that a maximum area of any region of a second plane bound by any closed convex curve defined by an intersection of the shaped optical film with the second plane is largest when the second plane is parallel to the first plane. The projected area has a centroid, a length along a first axis and a width along an orthogonal second axis. Each of the first axis and the second axis is disposed in the first plane and passes through the centroid. The width is a minimum length along any line segment in the first plane passing through the centroid and connecting opposite points on a boundary of the projected area. The shaped optical film has a first maximum sag being a difference in the maximum and minimum displacements from the first plane of the shaped optical film along the first axis. The shaped optical film has a second maximum sag being a difference in the maximum and minimum displacements from the first plane of the shaped optical film along the second axis. A first ratio of the first maximum sag to the length is at least 1.01 times a second ratio of the second maximum sag to the width. The second ratio is at least 0.05.

DETAILED DESCRIPTION

Figure 1A:
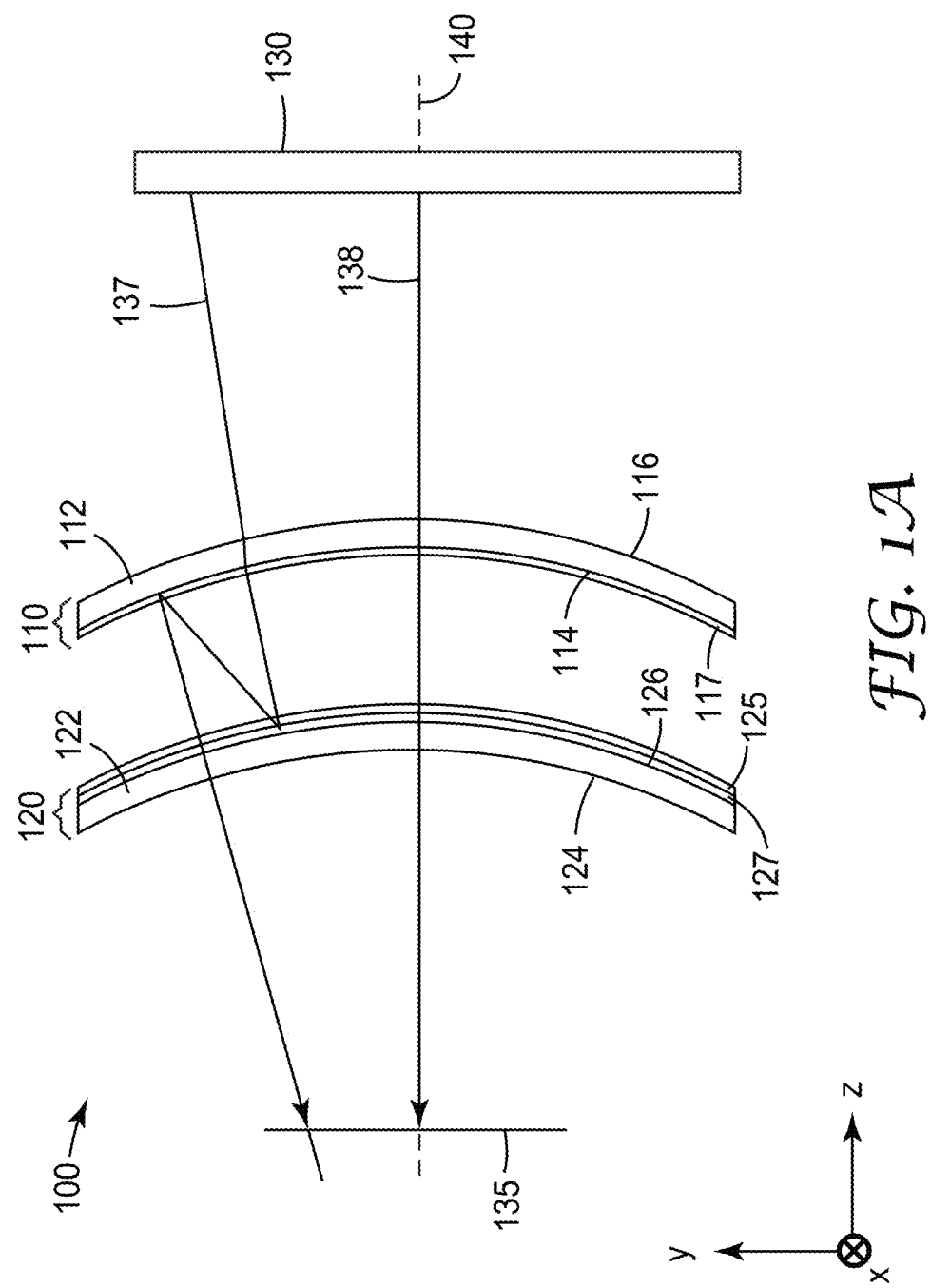
FIG. 1A is a cross-sectional view of an optical system.

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Optical systems of the present description can be used in head-mounted displays to provide a wide field of view in a compact system having a low profile. In some embodiments, the optical systems include one or more optical lenses, and a partial reflector and a reflective polarizer, each of which may be disposed on or within the one or more lenses, to provide a folded optical path between an image source and an exit pupil. According to the present description, it has been found that the lens(es) or other optical element(s), such as the partial reflector and/or the reflective polarizer, used in such systems can provide an improved field of view if the geometry of the lens(es) or other optical element(s) is suitably selected. In particular, it has been found that a peripheral portion of the lens or lenses used in the optical system can be extended, without sacrificing mechanical properties of the lens(es), so that the lens(es) can substantially conform to the shape of a viewer's face. In head-mounted systems, this allows for an immersive viewing environment where boundaries of field of view are not visible or not noticeable. In some embodiments, the field of view can be even be extended further than what normal vision allows. This is because the field of view of normal vision is limited by facial features, such as the nose or eyebrows, and the lens(es) of the optical systems can be placed sufficiently close to the viewer's eye so that the field of view is not limited by facial features. This can also provide improved three-dimensional viewing compared to that allowed by normal vision since some regions of the field of view of normal vision is blocked from one eye by a facial feature and images viewed in these regions appear two-dimensional because they are viewed with only one eye. In some embodiments, the optical systems of the present description allows content presented to the viewer in these regions of the field of view to be viewed by both eyes and therefore appear three-dimensional when three-dimensional image content is provided.

As another example of a benefit of extending the field of view beyond the boundaries set by facial features, in some embodiments, the optical systems of the present description can be used to provide an enhanced viewing experience to a person having only one eye. In this case, the natural field of view is severely limited by facial features. By widening the field of view so that it is not limited by facial features, the optical systems of the present description can provide an enhanced field of view to a viewer with only one eye that may appear more natural to the viewer since the optical system may provide images to the viewer in regions of the field of view that would ordinarily be provided by the other eye.

Conventionally, lenses have a shape which is defined by a lens equation selected to give desired optical properties (e.g., image focus and resolution). Extending a peripheral portion of a lens defined by a single lens equation can result in thin, and therefore mechanically weak, peripheral portions of the lens. However, according to the present description, it has been found that an altered shape of the lens can be defined using more than one lens equation, or using a free-form shape, and that this can result in a peripheral portion having sufficient thickness to provide desired mechanical properties while maintaining optical properties suitable for providing a peripheral portion of a viewable image in a head-mounted display.

Figure 8:
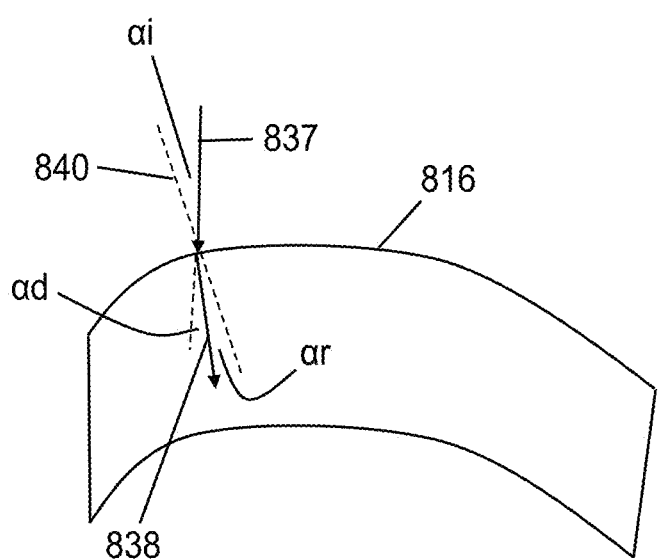
FIG. 8 is a cross-sectional view of a light ray incident on a surface.

One or more of the lenses or other optical elements (e.g., partial reflector, reflective polarizer, or retarder) used in the optical systems may have an optical axis and the lens(es) or optical element(s) may be rotationally asymmetric about the optical axis at least in part due a rotationally asymmetric edge of the lens(es) or optical element(s) and/or due to an azimuthal dependence of the curvature of a surface of the lens(es) or optical element(s). The optical axis of such a rotationally asymmetric lens or optical element can be understood as an axis near the center of the lens or optical element where a light ray emitted by a display and propagating along the optical axis passes through the lens(es) and/or optical element(s) with a minimum degree of refraction so that light propagation along axes close to but different from the optical axis experience greater degrees of refraction. The light ray along the optical axis may pass through the lens(es) and/or optical element(s) without being refracted or without being substantially refracted. FIG. 8 illustrates an incident light ray 837 which is incident on surface 816 at an angle of incidence $\alpha i$ with respect to the surface normal 840, and a refracted light ray 838 having an angle of refraction $\alpha r$ with respect to the surface normal 840. The magnitude of the difference between the angle of incidence $\alpha i$ and angle of incidence $\alpha r$ is denoted $\alpha d$ and is equal to the angle between the light ray 837 incident on the surface 816 and the light ray 838 transmitted through the surface 816. Without being substantially refracted means that the angle $\alpha d$ between a light ray incident on a surface and a light ray transmitted through the surface is no more than 15 degrees. In some embodiments, an angle $\alpha d$ between the incident ray and the transmitted ray is less than 10 degrees, or less than 5 degrees, or less than 3 degrees, or less than 2 degrees. In some embodiments, an optical system includes a first lens, a second lens, a partial reflector and a reflective polarizer, and a light ray propagating along the optical axis of the optical system passes through the first lens, the second lens, the partial reflector and the reflective polarizer without being substantially refracted. In some embodiments, a light ray propagating along the optical axis passes through the first lens, the second lens, the partial reflector and the reflective polarizer without being refracted by more than 10 degrees, or more than 5 degrees, or more than 3 degrees, or more than 2 degrees at any major surface of the optical system.

In some embodiments, at least one or more of the lenses or other optical elements (e.g., partial reflector, reflective polarizer, or retarder) used in the optical system is not rotationally symmetric about any axis. In some embodiments, at least one major surface of one or more of the lenses or other optical elements used in the optical system is not rotationally symmetric about any axis. Any optical element, major surface, or lens described as rotationally asymmetric about an optical axis, may, in some embodiments, also be rotationally asymmetric about all axes (i.e., the optical element, major surface or lens may not be rotationally symmetric about any axis).

At least one major surface of at least one lens or optical element may have a first portion (e.g., an inner portion), which may be rotationally symmetric about the optical axis and which is defined by a first equation, and a second portion (e.g., a peripheral portion), which is rotationally asymmetric about the optical axis and which is defined by a different second equation. One or both of the first and second equations may be rotationally symmetric about the optical axis or may be rotationally asymmetric about the optical axis by depending on the azimuthal angle (polar coordinate) about the optical axis. In some embodiments, the rotationally asymmetric lens(es) and/or optical elements(s) have one or more planes of symmetry comprising the optical axis. In some embodiments, the rotationally asymmetric lens(es) and/or optical element(s) have no more than two planes of symmetry, or no more than one plane of symmetry. In some embodiments, the rotationally asymmetric lens(es) or optical elements(s) have no planes of symmetry. In some embodiments, the optical system includes at least one major surface (e.g., a major surface of a lens, a partial reflector, and/or a reflective polarizer) that is rotationally asymmetric about the optical axis. In some embodiments, at least one of a first lens, a second lens, a partial reflector and a reflective polarizer has at least one plane of asymmetry comprising the optical axis.

Utilizing rotationally asymmetric shapes allows a maximum sag to be achieved compared to utilizing a symmetric shape. This is because for surfaces having a given maximum sag, films attached to the surface do not have to stretch as much overall to conform to an asymmetric surface as to conform to a symmetric surface. Since, in some embodiments, at least one of the lens(es) in the optical systems of the present description includes a film, such as a reflective polarizer film, disposed on an outer major surface of a lens or disposed within a lens (e.g., at an internal interface between two portions of a lens doublet), the asymmetric shape of the lens allows the film to stretch less on the average compared to a symmetric lens having the same maximum sag. Utilizing a larger sag to diameter ratio allows for a wider field of view and improved eye relief.

Figure 9:
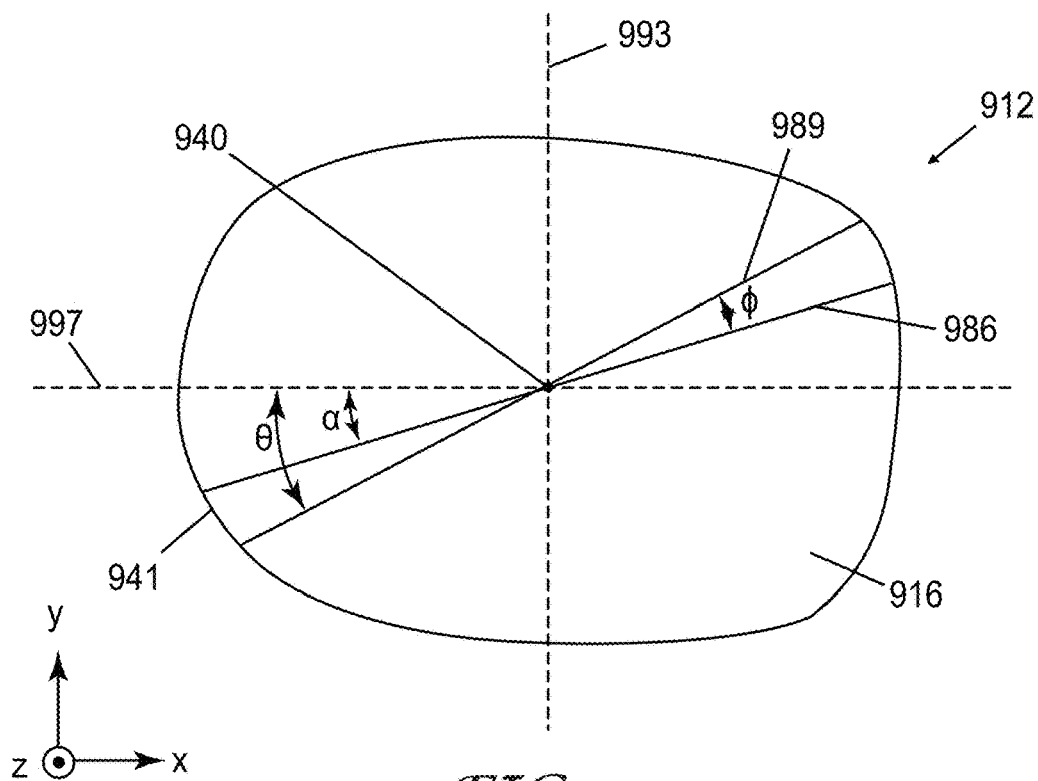
FIG. 9 is a front view of a lens.

FIG. 9 is a front view of lens 912 having first major surface (which may correspond to first major surface 114 or 124, for example, and which not illustrated in FIG. 9), an opposing second major surface 916 (which may correspond to second major surface 126 or 116, for example), a principle axis 940, and an edge 941. The lens 912 may also have first and second portions (e.g., interior and peripheral portions) as discussed further elsewhere herein (see, e.g., FIGS. 2B and 2D). The lens 912 has a major axis 989 which may be understood to be an axis along the projection onto the plane (x-y plane) orthogonal to the principle axis 940 of the line connecting the two points on the lens 912 that have a maximum distance between them. In some embodiments, lens 912 includes a lens substrate (corresponding to lens 122, for example) and a film disposed on the lens substrate (corresponding to reflective polarizer 127, for example). The major axis 989 may be described as a major axis of lens 912 or of the lens substrate of lens 912. As used herein, a principle axis of a lens is an axis extending from a pupil of a viewer's eye through the lens when the lens is placed adjacent the eye of the viewer and the viewer is looking straight ahead. The principle axis 940 may be coincident with an optical axis of an optical system including the lens 912. Alternatively, a lens may be designed such that the lens is not orthogonal to the principle axis when positioned adjacent an eye of a viewer. In this case, an optical axis of the optical system including the lens, which is an axis such that light along the optical axis passes through the lens without being refracted, may be at some angle (e.g., less than 20 degrees or less than 10 degrees, or 5 to 20 degrees) from the principle axis.

In some embodiments a film having anisotropic mechanical properties is disposed on the second major surface. In some embodiments, the film having anisotropic mechanical properties is aligned relative to the major axis 989. The film may have one or more axes defined by the anisotropic mechanical properties. For example, the film may have a film axis along which a mechanical property (e.g., modulus, elongation, refractive index of one or more layers) which have a maximum or a minimum. In some embodiments, the film has one or more layers that are oriented predominately along a first film axis (e.g., substantially uniaxially oriented along the first film axis). In some embodiments, the film is a reflective polarizer having a block axis and a pass axis. The reflective polarizer may include a plurality of polymeric layers substantially uniaxially oriented along the block axis and the pass axis is orthogonal to the first axis. In some embodiments, the film is aligned relative to the major axis 989 by being disposed on the lens 912 such that the film axis 986 of the film (which may be a pass or a block axis of a reflective polarizer, for example) is within an angle φ of the major axis 989. In some embodiments the angle φ is 30 degrees, or 20 degrees, or 10 degrees. In some embodiments, the film is aligned relative to the major axis 989 by being disposed on the lens 912 such that an angle φ between the film axis 986 and the major axis 989 is in a range of 30 to 60 degrees, or in a range of 35 to 55 degrees, or in a range of 40 to 50 degrees. In some embodiments, the film is aligned relative to the major axis 989 by being disposed on the lens 912 such that an angle φ between the film axis 986 and the major axis 989 is in a range of 60 to 90 degrees.

In general a film axis, such as film axis 986 may be aligned in a predetermined way relative to any axis of a lens by being disposed at a predetermined angle relative to the axis of the lens. The predetermined angle may be selected based on the design of an optical system including the lens, for example. The predetermined angle may be about 0 degrees (within 30 degrees, or 20 degrees, or 10 degrees, or 5 degrees of 0 degrees), about 90 degrees (within 30 degrees, or 20 degrees, or 10 degrees, or 5 degrees of 90 degrees), or about 45 degrees (within 30 degrees, or 20 degrees, or 10 degrees, or 5 degrees of 45 degrees), for example.

In some embodiments, the lens 912 is adapted to be placed adjacent an eye of a viewer and is oriented with a horizontal axis 997 and a vertical axis 993 along horizontal and vertical directions, respectively, when placed adjacent the eye of the viewer with the view's head in an upright position. In some embodiments, the film is aligned relative to the major axis 989 by being disposed on the lens 912 such that an axis of the film (e.g., pass or block axis) is parallel with the one of the horizontal and vertical axes 997 and 993 that is oriented closer to the major axis 989. In some embodiments, the film axis 986 has an angle α of no more than 30 degrees or no more than 20 degrees from the horizontal axis 997, while in other embodiments, the film axis 986 has an angle of no more than 30 degrees or no more than 20 degrees from the vertical axis 993.

In some embodiments, the film having anisotropic mechanical properties may be disposed on the first major surface opposite the second major surface 916. The film may be aligned relative to the major axis 989 in the same ways as described for the case where the film is disposed on the second major surface 916. In some embodiments, a first film having anisotropic mechanical properties is disposed on the first major surface and a second film having anisotropic mechanical properties is disposed on the second major surface 916 and each of the first and second films are aligned relative to the major axis 989.

FIG. 1A is a schematic cross-sectional view of optical system 100 including a first optical stack 110, which includes first lens 112, disposed between a display 130 and an exit pupil 135, and a second optical stack 120, which includes second lens 122, disposed between the first optical stack 110 and the exit pupil 135. In some embodiments, each of the first and second optical stacks 110 and 120 are convex toward the display 130 along orthogonal first and second axes. In some embodiments, at least one of the first and second lenses 112 and 122 have optical power in two mutually orthogonal directions. An x-y-z coordinate system is provided in FIG. 1A. The orthogonal first and second axes may be the x- and y-axes, respectively, which define two mutually orthogonal directions. In other embodiments, one or both of the first and second lenses may have one or more surfaces that are not convex. In some embodiments, one or both lenses are plano-convex and in some embodiments, one or both lenses are plano-concave. In some embodiments, one lens is plano-convex and the other is plano-conave. In some embodiments, the reflective polarizer is disposed on a surface that is convex towards the display and the quarter-wave retarder is disposed on a flat surface. The surface that is convex towards the display can be, for example, the curved surface of a plano-convex lens that is disposed with the curved surface of the lens facing the display or the curved surface of a plano-concave lens that is disposed with the flat surface of the lens facing the display.

The first optical stack 110 includes a first optical lens 112 having opposing first and second major surfaces 114 and 116 respectively. As described further elsewhere herein, the first optical lens 112 may be rotationally asymmetric about optical axis 140, and may also be asymmetric about all planes containing the optical axis 140, by having a peripheral portion with a rotationally asymmetric contoured edge (the rotationally asymmetric contour is not visible in the cross-section of FIG. 1A. A rotationally asymmetric contour is shown in FIG. 2B, for example.). Also as described further elsewhere herein, the first and second major surfaces 114 and 116 may be defined by different equations. Furthermore, one or both of the first and second major surfaces 114 and 116 may have first (e.g., interior) and second (e.g., peripheral) portions defined by different equations. The first optical stack 110 includes a partial reflector 117 disposed on the first major surface 114. The partial reflector 117 has an average optical reflectance of at least 30% for at least one desired or predetermined wavelength and may have an average optical transmission of at least 30% for the at least one desired or predetermined wavelength. The at least one desired or predetermined wavelength may be a desired or predetermined plurality of wavelengths which may be a single continuous range of wavelengths (e.g., a visible range of 400 nm to 700 nm) or it may be a plurality of continuous ranges of wavelengths. The partial reflector may be a notch reflector and the at least one desired or predetermined wavelength may include one or more wavelength ranges at least some of which having a full-width at half-maximum reflection band of no more than 100 nm or no more than 50 nm, for example. The optical system 100 also includes a reflective polarizer 127 which may, for example, be a wide-band reflective polarizer or a notch reflective polarizer having reflection bands that match or substantially match reflection the bands of the partial reflector. In some cases, the optical system may be adapted for use with one or more lasers and the at least one desired or predetermined wavelength may be a laser wavelength or may include narrow band(s) (e.g., 10 nm in width) about the laser(s) wavelength(s). In some embodiments, the at least one desired or predetermined wavelength may be a visible wavelength range, an infrared wavelength range, an ultraviolet wavelength range, or some combination of visible, infrared and ultraviolet wavelengths.

In some embodiments, the reflective polarizer 127 substantially transmits light having a first polarization state and substantially reflects light having an orthogonal second polarization state (e.g., polarization states corresponding to linear polarization states along the x- and y-axes, respectively). In some embodiments, the reflective polarizer is curved about two orthogonal axes (e.g., the x- and y-axes) and is not rotationally symmetric about any axis. Reflective polarizer 127 may be described as substantially transmitting light having a first polarization state (e.g., light linearly polarized along the y-axis) if, for at least one desired wavelength, at least 60 percent (or at least 70 percent, or at least 80 percent) of light having the first polarization state is transmitted through the reflective polarizer 127. Reflective polarizer 127 may be described as substantially reflecting light having an orthogonal second polarization state (e.g., light linearly polarized along the x-axis) if, for at least one desired wavelength, at least 60 percent (or at least 70 percent, or at least 80 percent) of light having the second polarization state is reflected from the reflective polarizer 127.

The second optical stack includes a second optical lens 122 having first and second major surfaces 124 and 126. As described further elsewhere herein, the second optical lens 122 may be rotationally asymmetric about optical axis 140 by having a peripheral portion with a rotationally asymmetric contoured edge (the rotationally asymmetric contour is not visible in the cross-section of FIG. 1A. A rotationally asymmetric contour is shown in FIG. 2B, for example). Also as described further elsewhere herein, the first and second major surfaces 124 and 126 may be defined by different equations. Furthermore, one or both of the first and second major surfaces 124 and 126 may have first (e.g., interior) and second (e.g., peripheral) portions defined by different equations. The second optical stack 120 includes a reflective polarizer 127 disposed on the second major surface 126 and includes a quarter-wave retarder 125 disposed on the reflective polarizer 127. Quarter-wave retarder 125 may be a film laminated on the reflective polarizer 127 or may be a coating applied to the reflective polarizer 127. In other embodiments, quarter-wave retarder 125 can be disposed between and spaced apart from the first and second lenses 112 and 122, such as, for example, on a major surface of a third lens disposed between the first and second lenses 112 and 122. The optical system 100 may include one or more additional retarders. For example, a second quarter-wave retarder may be included in first optical stack 110 and may be disposed on the second major surface 116. The quarter-wave retarder 125 and any additional quarter-wave retarders included in optical system 100 may be quarter-wave retarders at at least one wavelength in the at least one desired wavelength. In some embodiments, the at least one desired wavelength is a desired plurality of wavelengths and the retarder(s) is a quarter-wave retarder(s) at at least one wavelength in the desired plurality of wavelengths. The second optical stack 120 may alternatively be described as including the second lens 122 and the reflective polarizer 127 disposed on the second lens 122 and the quarter-wave retarder 125 may be regarded as a separate layer or coating that is disposed on the second optical stack 120 rather than being included in the second optical stack 120. In this case, the quarter-wave retarder 125 may be described as being disposed between the first optical stack 110 and the second optical stack 120. The second optical stack 120, or the combination of the second lens 122 and the reflective polarizer 127, may also be referred to as a lens comprising a reflective polarizer, in which case the second lens 122 may be referred to as a lens substrate. In some embodiments, the quarter-wave retarder 125 may not be attached to the second optical stack 120, and in some embodiments, the quarter-wave retarder 125 is disposed between and spaced apart from the first and second optical stacks 110 and 120. In still other embodiments, the quarter-wave retarder 125 may be disposed on the partial reflector 117 and may be described as being included in the first optical stack 110 or may be described as being disposed between the first and second optical stacks 110 and 120.

Light rays 137 and 138 are each emitted by display 130 and transmitted through the exit pupil 135. Light ray 138 passes through the first and second optical stacks 110 and 120 without being refracted or without being substantially refracted and thereby defines the optical axis 140 of the optical system 100. Light ray 137 (and similarly for light ray 138) is, in sequence, emitted from display 130, transmitted through second major surface 116 (and any coatings or layers thereon), transmitted through first optical lens 112, transmitted through partial reflector 117, transmitted through the quarter-wave retarder 125 disposed on the reflective polarizer 127, reflected from reflective polarizer 127, transmitted back through quarter-wave retarder 125, reflected from partial reflector 117, transmitted through quarter-wave retarder 125, transmitted through reflective polarizer 127, transmitted through second lens 122, and transmitted through exit pupil 135. Light ray 137 may be emitted from the display 130 with a polarization state which is rotated to a first polarization state upon passing through quarter-wave retarder 125. This first polarization state may be a block state for the reflective polarizer 127. After light ray 137 passes through quarter-wave retarder 125, reflects from partial reflector 117 and passes back through quarter-wave retarder 125, its polarization state is a second polarization state substantially orthogonal to the first polarization state. Light ray 137 can therefore reflect from the reflective polarizer 127 the first time that it is incident on the reflective polarizer 127 and can be transmitted through the reflective polarizer 127 the second time that it is incident on the reflective polarizer 127.

Other light rays (not illustrated) reflect from the partial reflector 117 when incident on the partial reflector 117 in the minus z-direction or are transmitted by the partial reflector 117 when incident on the partial reflector 117 in the plus z-direction. These rays may exit optical system 100.

Figure 1B:
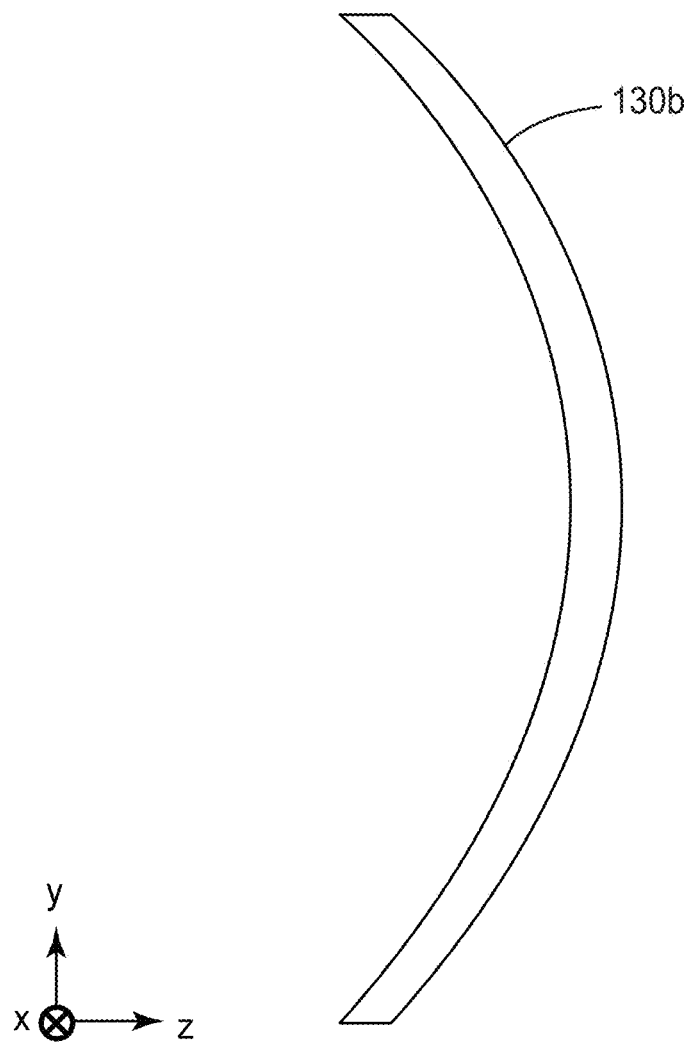
FIGS. 1B-1C are cross-sectional views of displays.
Figure 1C:
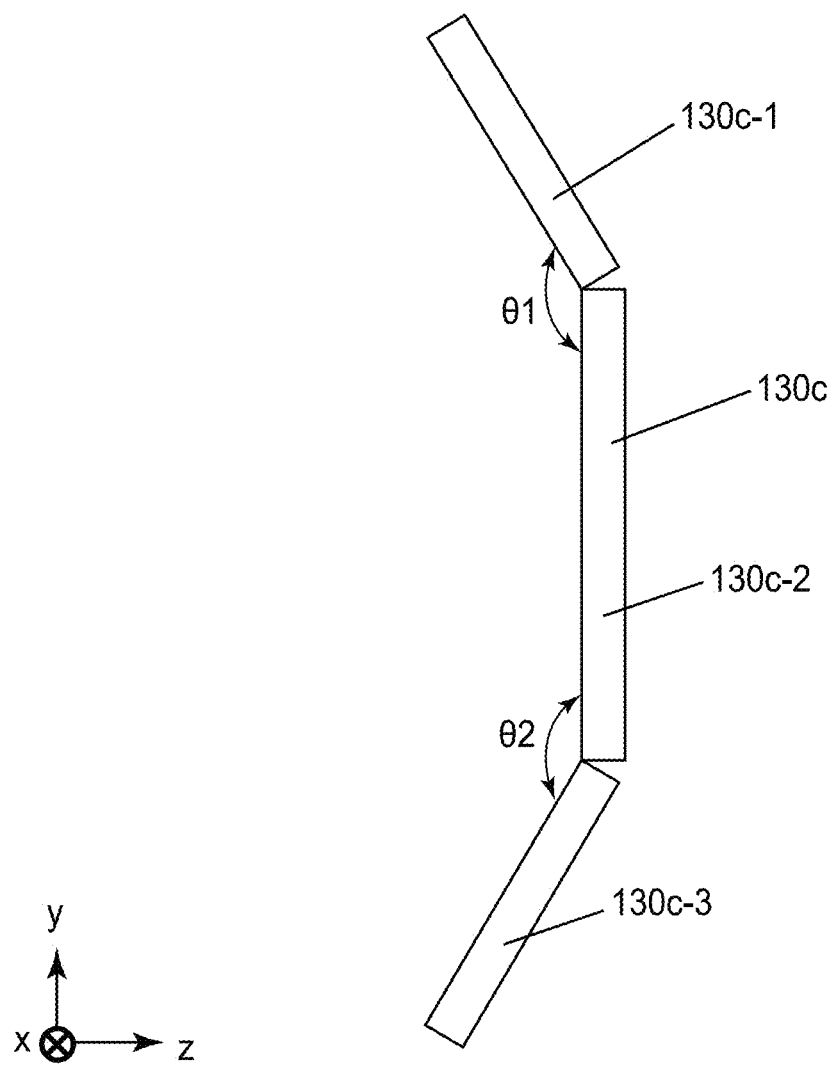

The display 130 may be any suitable type of display including, for example, liquid crystal displays (LCDs) and organic light emitting diode (OLED) displays. The display 130 may be substantially flat or planar as illustrated in FIG. 1A, or may be curved as illustrated in FIG. 1B, or may include a plurality of flat or planar panels disposed at obtuse angles relative to one another as shown in FIG. 1C, for example. FIG. 1B is a schematic cross-sectional view of display 130*b* which is concave toward the lens(es) of the optical system (e.g., the display 130*b* may be curved toward the lenses 112 and 122). Display 130*b* may be curved in one dimension (a simple curve) or in two dimensions (a compound curve). For example, display 130*b* may be curved in one or both of the orthogonal x- and y-directions. A display curved in two dimensions may have two different curvatures (e.g., the curvature in the x- and y-directions may be different. Such displays include toroidal displays, for example). FIG. 1C is a schematic cross-sectional view of display 130*c* which is includes substantially planar panels 130*c*-1, 130*c*-2 and 130*c*-3. The panels 130*c*-1 and 130*c*-2 are disposed at an obtuse angle θ1 relative to each other, and the panels 130*c*-2 and 130*c*-3 are disposed at an obtuse angle θ2 relative to each other. The panels 130*c*-1, 130*c*-2 and 130*c*-3 are disposed to face the lens(es) of the optical system (e.g., the panels 130*c*-1, 130*c*-2 and 130*c*-3 may face toward the lenses 112 and 122). Either of the displays 130*b* and 130*c* may be used in place of the display 130 of FIG. 1A.

In some embodiments, substantially any chief light ray that is emitted by the display 130 and that passes through the exit pupil 135 is incident on each of the first optical stack 110 and the second optical stack 120 with an angle of incidence less than about 30 degrees, less than about 25 degrees, or less than about 20 degrees, the first time or each time that the chief light ray is incident on the first or second optical stacks 110 or 120. In any of the optical systems of the present description, substantially any chief light ray emitted by the display and that passes through the exit pupil is incident on each of the reflective polarizer and the partial reflector with an angle of incidence less than about 30 degrees, less than about 25 degrees, or less than about 20 degrees, the first time or each time that the chief light ray is incident on the reflective polarizer or the partial reflector. If a large majority (e.g., about 90 percent or more, or about 95 percent or more, or about 98 percent or more) of all chief rays emitted from a display and transmitted through the exit pupil satisfy a condition, it may be said that substantially any chief ray satisfies that condition.

As described further in U.S. application Ser. No. 14/865,017 filed on Sep. 25, 2015, which is hereby incorporated herein by reference to the extent that it does not contradict the present description, various factors can cause light to be partially transmitted through the reflective polarizer 127 the first time that light emitted by the display 130 is incident on the reflective polarizer 127. This can cause unwanted ghosting or image blurriness at the exit pupil 135. These factors can include performance degradation of the various polarizing components during forming and unwanted birefringence in the optical system 100. The effects of these factors can combine to degrade the contrast ratio and efficiency of the optical system 100. Such factors can be minimized by using relatively thin optical lenses, which can reduce unwanted birefringence in the lenses, for example, and using thin optical films, which can reduce optical artifacts arising from thermoforming optical films, for example. In some embodiments, the first and second optical lenses 112 and 122 each have a thickness less thickness less than 7 mm, less than 5 mm, or less than 3 mm, and may have a thickness in a range of 1 mm to 5 mm, or 1 mm to 7 mm, for example. In some embodiments, the reflective polarizer 127 may have a thickness of less than 75 micrometers, less than 50 micrometers, or less than 30 micrometers. In some embodiments, the contrast ratio at the exit pupil 135 is at least 40, or at least 50, or at least 60, or at least 80, or at least 100 over the field of view of the optical system 100. In some embodiments, the two optical stacks are portions of a unitary stack (e.g., an integral optical stack as described in U.S. application Ser. No. 14/865,017) which may have a thickness less than 12 mm or in a range of 2 mm to 12 mm, for example.

It has been found that the contrast ratio can be significantly higher if the reflective polarizer 127 is a thermoformed (so that it is curved about two orthogonal axes) multilayer optical film which was uniaxially oriented prior to thermoforming (e.g., Advanced Polarizing Film (APF), available from 3M Company, St. Paul, MN), compared to using other reflective polarizers curved about two orthogonal axes. Other reflective polarizers, such as non-uniaxially oriented multilayer polymeric film reflective polarizers or wire grid polarizers, may also be used.

It has been found that suitably choosing the shapes of the various major surfaces (e.g., second major surface 126 and first major surface 114) that the optical system can provide distortion sufficiently low that the image does not need to be pre-distorted. In some embodiments, the display 130 is adapted to emit an undistorted image. The shapes may be selected such that interior and peripheral portions have different profiles (e.g., defined by different equations), since as discussed further elsewhere herein, such shapes have been found to be useful in providing robust lenses and widened field of view compared to shapes having a uniform profile (e.g., defined by a single lens equation). In some embodiments, one or more of the various major surfaces are free-form surfaces as described further elsewhere herein. The partial reflector 117 and the reflective polarizer 127 may have different shapes selected such that a distortion of the emitted undistorted image transmitted by the exit pupil 135 is less than about 10%, or less than about 5%, or less than about 3%, of a field of view at the exit pupil 135. The field of view at the exit pupil may be greater than 80 degrees, greater than 90 degrees, or greater than 100 degrees, for example.

The reflective polarizer 127, the quarter-wave retarder 125 and the partial reflector 117 may be disposed on different surfaces of the optical lenses rather than on those illustrated in the embodiment of FIG. 1A. For example, the partial reflector may be alternatively disposed on the second major surface 116 of the first optical lens 112 rather than on the first major surface 114. As another example, the reflective polarizer 127 may be disposed on the first major surface 124 of the second optical lens 122 and the quarter-wave retarder 125 may be disposed on the second major surface 126. Other contemplated examples of the possible arrangements of the reflective polarizer 127, the quarter-wave retarder 125 and the partial reflector 117 are described further in U.S. application Ser. No. 14/865,017, previously incorporated herein by reference. Any arrangements where the partial reflector and the reflective polarizer are disposed proximate to and spaced apart from one another with the partial reflector facing the display and the reflective polarizer facing the exit pupil of the optical system and with a quarter-wave retarder disposed between the partial reflector and the reflective polarizer are contemplated. In alternate embodiments, the reflective polarizer may be replaced by a second partial reflector and the quarter-wave retarder may be omitted.

The lens systems of the present description may include two lenses as illustrated in FIG. 1A, or may include a single lens, or may include more than two lenses. For example, in some cases three lenses are included and the partial reflector, the quarter-wave retarder and the reflective polarizer are each disposed on a major surface of a different lens. As another example, a lens system may include a single lens with a partial reflector disposed on an outer surface of the lens (the major surface facing the display), a quarter-wave retarder disposed on an inner surface of the lens (the major surface facing the exit pupil), and a reflective polarizer disposed on the quarter-wave retarder. Single lens optical systems and optical systems with three lenses are described further in U.S. application Ser. No. 14/865,017, previously incorporated herein by reference.

Figure 2A:
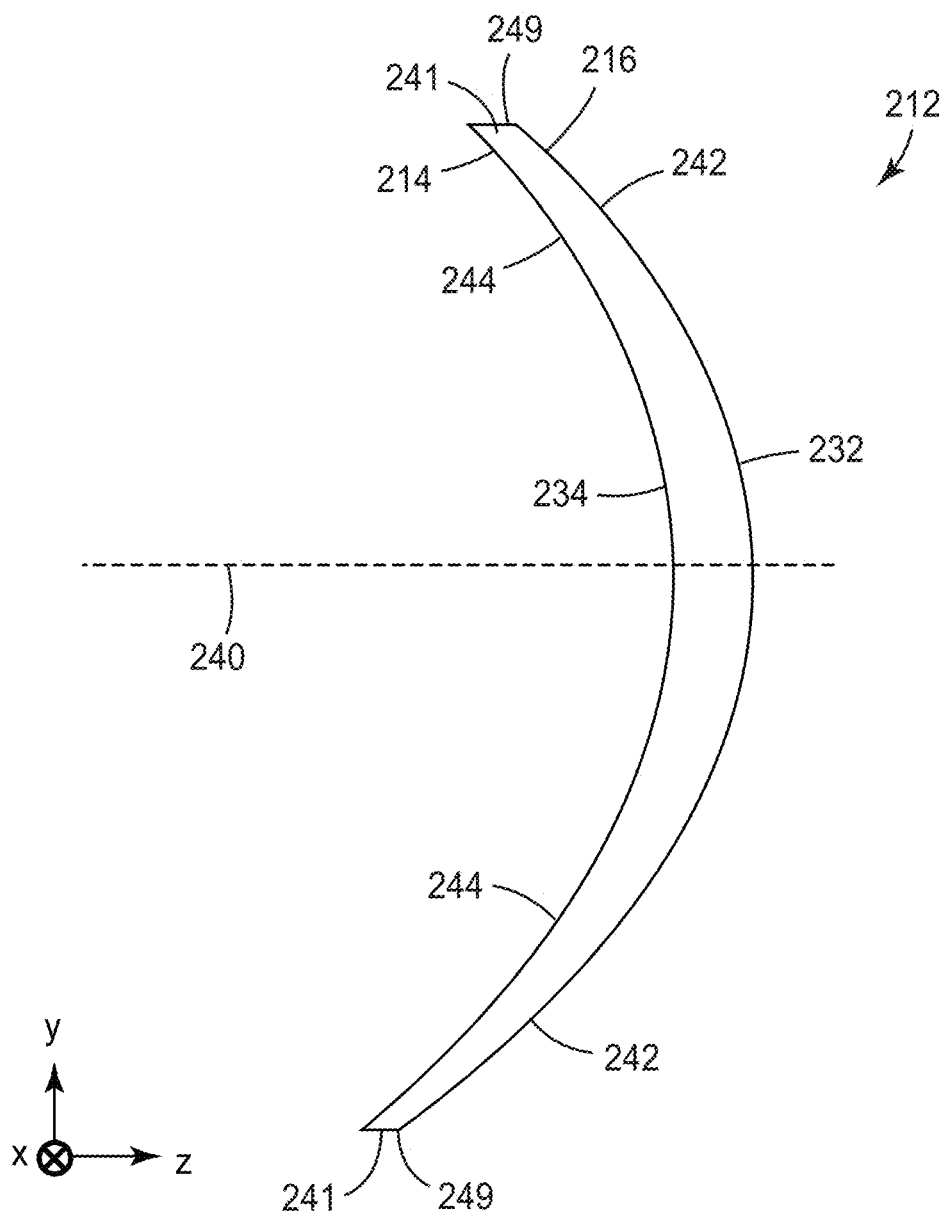
FIG. 2A is a cross-sectional view of a lens.
Figure 2B:
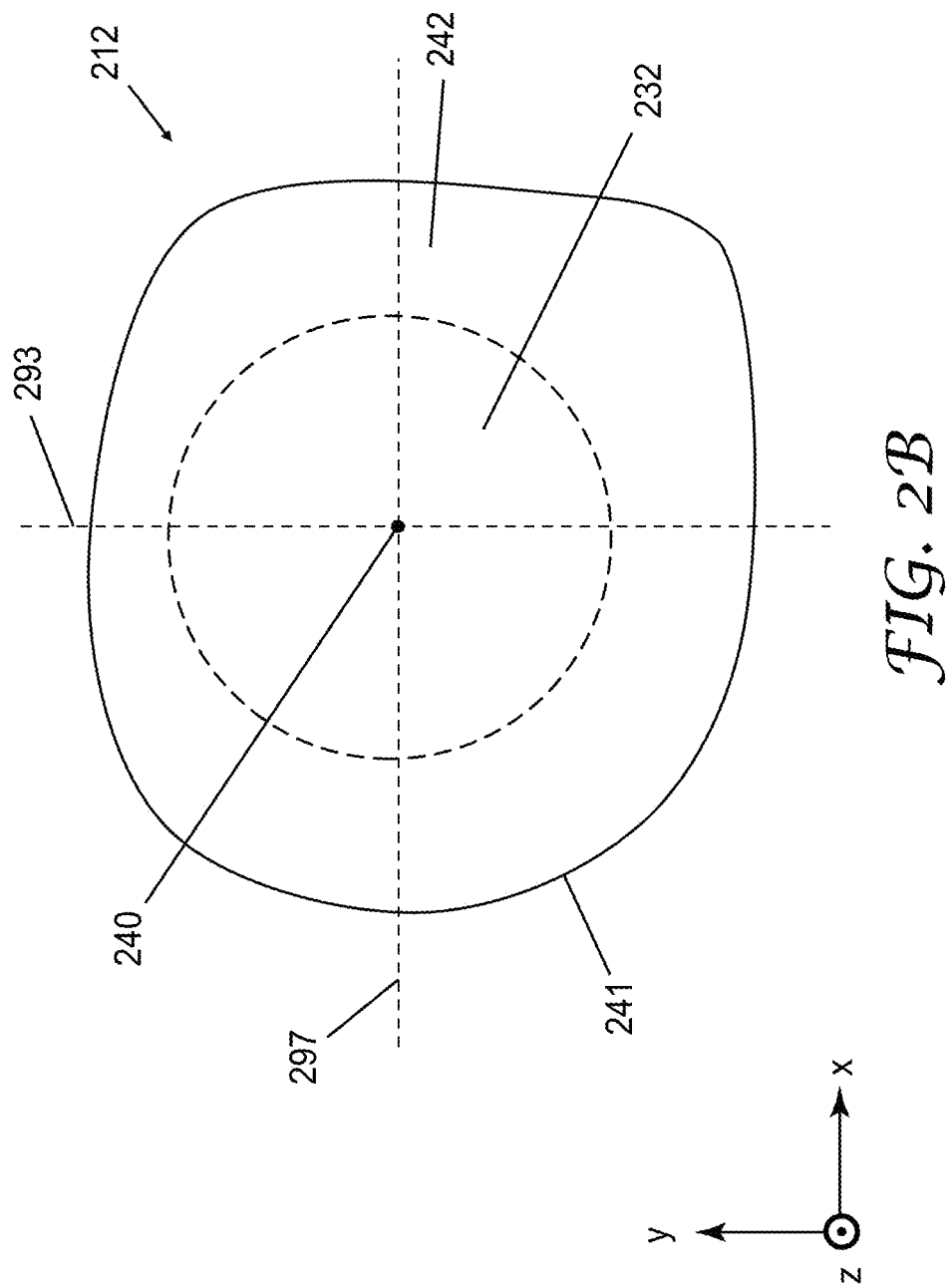
FIG. 2B is a front view of the lens of FIG. 2A.

FIGS. 2A-2B are cross-sectional and front views, respectively, of lens 212 which is rotationally asymmetric about optical axis 240 and which may correspond to either of the first and second lenses 112 and 122. Lens 212 includes opposing first and second major surfaces 214 and 216 and minor side surface 249 extending between and connecting the first and second major surfaces 214 and 216. First major surface 214 includes first portion 234 and second portion 244, which are interior and peripheral portions, respectively, in the illustrated embodiment. Second major surface 216 includes first portion 232 and second portion 242, which are interior and peripheral portions, respectively, in the illustrated embodiment. Lens 212 has an optical axis 240 which intersects first portions 232 and 234. Second portions 242 and 244 surround the first portions 232 and 234, respectively, and are adjacent the edge 241 of the lens 212. Interior first portions 232 and 234 may each rotationally symmetric about optical axis 240. Peripheral second portions 242 and 244 may be rotationally asymmetric about optical axis 240 due, at least in part, to a rotationally asymmetric edge 241.

It will be understood that a lens surface, for example, having some degree of roughness (from a manufacturing process for making the lens, for example) but that is otherwise rotationally symmetric will be considered rotationally symmetric in the present description as long as the surface roughness has an amplitude small enough (e.g., less than 0.25 or less than 0.1 times a wavelength of visible light) that it does not substantially affect optical properties of the lens.

Edge 241 may be contoured such that when the lens 212 is placed adjacent a viewer's eye, the edge 241 substantially conforms to the viewer's face. A contoured edge of a lens or other component may be adapted to substantially conform to a viewer's face by providing a gap between the contoured edge and the viewer's face which has a standard deviation substantially less (e.g., at least 30 percent less, or at least 50 percent less, or at least 70 percent less) than a standard deviation of a corresponding gap between a corresponding non-contoured edge of a corresponding non-contoured lens or other component and the viewer's face. A standard deviation of a gap between an edge of a lens, for example, and the viewer's face can be determined as the square root of the average of the squared difference in the gap and the average gap around a perimeter of the lens. In some embodiments, the optical systems of the present description utilize a contoured edge adapted to substantially conform to a face of an average person, or of an average adult person, or of an average adult human male, or of an average adult human female, or of an average adult of a specific gender and race, as defined from craniofacial anthropometric normative data such as, for example, those available from the FaceBase Consortium which is described in Hochheiser, et al., "The FaceBase Consortium: a comprehensive program to facilitate craniofacial research", Developmental biology 355.2 (2011): 175-182. In some embodiments, the optical systems of the present description utilize a contoured edge that is custom shaped for specific individuals. The contoured edge 241 may be created in the molding of the lens 212. Alternatively, the lens 212 can be custom ground for individuals using appropriate measurements of the face.

In some embodiments, lens 212 includes a reflective polarizer. In some embodiments, lens 212 includes a lens substrate and the reflective polarizer is disposed on a major surface of the lens substrate. For example, in some embodiments, the reflective polarizer is disposed on the first major surface 214, and in some embodiments, the reflective polarizer is disposed on the second major surface 216. In some embodiments, the lens has optical power in two orthogonal dimensions. The reflective polarizer, which may correspond to reflective polarizer 127 disposed on second major surface 126 of second lens 122, substantially transmits light having a first polarization state and substantially reflects light having an orthogonal second polarization state (e.g., polarization states corresponding to linear polarization states along the x- and y-axes, respectively, or left and right circular polarization states). In some embodiments, the reflective polarizer is curved about two orthogonal axes (e.g., the x- and y-axes) and is not rotationally symmetric about any axis.

In some embodiments, the peripheral second portions 242 and 244 are rotationally asymmetric about optical axis 240 due, at least in part, to a curvature which varies with azimuthal angle about optical axis 240. In some embodiments, interior first portions 232 and 234 may also be rotationally asymmetric about optical axis 240 due to a curvature which varies with azimuthal angle about optical axis 240. In some embodiments, at least one of the first and second major surfaces 214 and 216 is a toroidal major surface, which for example, has differing curvatures in the x- and y-directions.

Lens 212 also has at least one plane of asymmetry containing the optical axis 240. For example, lens 212 is asymmetric under reflection about plane 293, which is parallel to the y-z plane and which contains optical axis 240, since the portion of the lens extending in the positive x-direction from the plane 293 does not have the same geometry as the portion of the lens extending in the negative x-direction from the plane 293. All other planes containing the optical axis 240 are related to plane 293 by rotation of the plane 293 through an angle about the optical axis 240. For example, plane 297 is related to plane 293 by rotation through 90 degrees about optical axis 240. Lens 212 is asymmetric under reflection about plane 297, which is parallel to the x-z plane and which contains the optical axis 240. Peripheral second portions 242 and 244 are asymmetric under reflection about all planes containing optical axis 240 due at least in part to a rotationally asymmetric edge 241. In the illustrated embodiments, all planes containing the optical axis 240 are planes of asymmetry. In other embodiments, a lens may have one, or two, or more, planes of asymmetry containing the optical axis. In some embodiments, at least one lens, or at least one major surface, of an optical system of the present description has at most one or two planes of reflection symmetry which contains the optical axis.

Figure 2C:
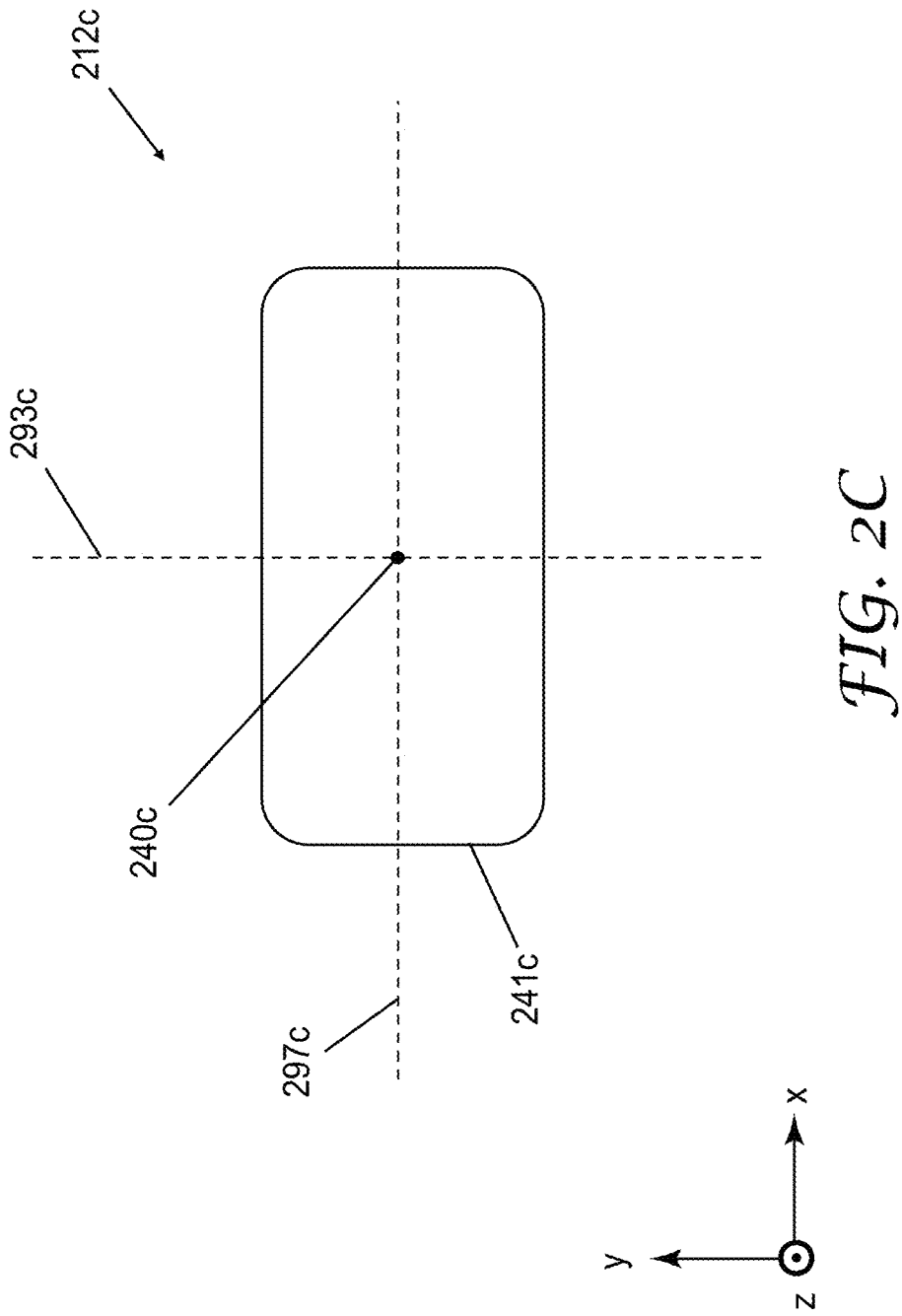
FIGS. 2C-2D are front views of lenses.

An example of a lens which is rotationally asymmetric about an optical axis and which contains two planes of reflection symmetry containing the optical axis, is illustrated in FIG. 2C. FIG. 2C is a front view of lens 212c which is rotationally asymmetric about optical axis 240c due, at least in part, to a rotationally asymmetric edge 241c. Lens 212c is reflection symmetric about planes 293c (parallel to the y-z plane and containing optical axis 240c) and about plane 297c (parallel to the x-z plane and containing optical axis 240c). Planes 293c and 297c are planes of symmetry of lens 212c.

First portion 232 may be defined by a first equation and second portion 242 may be defined by a second equation. That is, in some embodiments, first portion 232 has a shape given by a first equation which specifies a sag as a function of radial distance from the optical axis 240, while second portion 242 has a shape given by a second equation which similarly specifies a sag as a function of radial distance from the optical axis 240. In some embodiments, the first and/or the second equations are rotationally asymmetric. In some embodiments, the first and/or the second equations are rotationally symmetric. In some embodiments, the first and/or second equations are aspheric polynomial sag equations. Similarly, first portion 234 may be defined by a first equation and second portion 244 may be defined by a second equation. Utilizing different first and second equations to define the shapes of the surface(s) allows greater flexibility in defining the shape of peripheral portions which allows for a larger field of view and/or a more compact form factor than what can readily be achieved with using a single lens equation to describe an entire major surface of the lens.

In some embodiments, the first major surface 214 is defined by a first equation and second major surface 216 is defined by a second equation which may be different from the first equation. Each of the first and second equations may be aspheric polynomial sag equations. In some embodiments, the first portion 234 is defined by a first equation, the second portion 244 is defined by a second equation, the first portion 232 is defined by a third equation and the second portion 242 is defined by a fourth equation. Each of the first, second, third and fourth equations may be rotationally symmetric and may be aspheric polynomial sag equations. Alternatively, one or more of the first, second, third and fourth equations may be rotationally asymmetric. In some embodiments, at least one of the first, second, third and fourth equations is different from at least one other of the first, second, third and fourth equations. In some embodiments, each of the first, second, third and fourth equations is different from all other of the first, second, third and fourth equations.

Figure 2D:
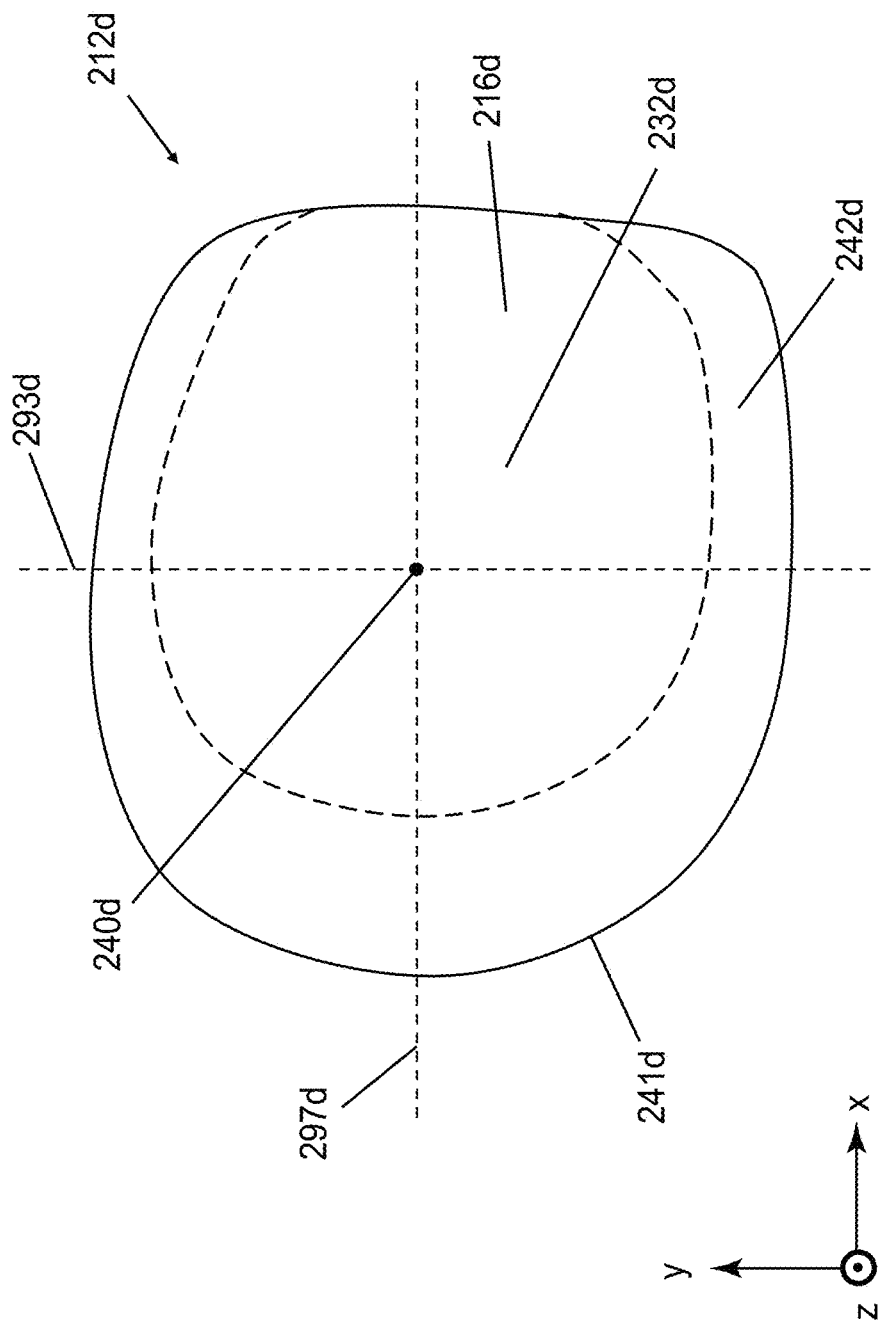

In some embodiments, the first portion of the lens is not an interior portion, but includes portions of an edge of the lens. This is illustrated in FIG. 2D which is a front view of lens 212d which is rotationally asymmetric about optical axis 240d and which may correspond to either of the first and second lenses 112 and 122. Lens 212d includes a first major surface corresponding to first major surface 214 and includes opposing second major surface 216d corresponding to second major surface 216. Second major surface 216d includes first portion 232d and second portion 242d adjacent to first portion 232d. The first major surface (not illustrated) opposite the second major surface 216d may also include first and second portions. The lens has an edge 241d, a portion of which bounds both the first and second portions 232d and 242d. First portion 232d may be defined by a first equation and second portion 242d may be defined by a different second equation. One or both of the first and second equations may be rotationally symmetric, or one or both of the first and second equations may be rotationally asymmetric. Each of the first and second equations may be aspheric lens equations. In the illustrated embodiments, lens 212d has no plane of reflection symmetry containing the optical axis 240d. In other embodiments, the lens 212d may have one or more planes of reflection symmetry containing the optical axis 240d. In some embodiments, lens 212d has at least one, or at least two, plane(s) of asymmetry containing the optical axis 240d. For example, lens 212d is asymmetric about plane 293d, which is parallel to the y-z plane and which contains optical axis 240d, and asymmetric about plane 297d, which is parallel to the x-z plane and which contains optical axis 240d.

Figure 3:
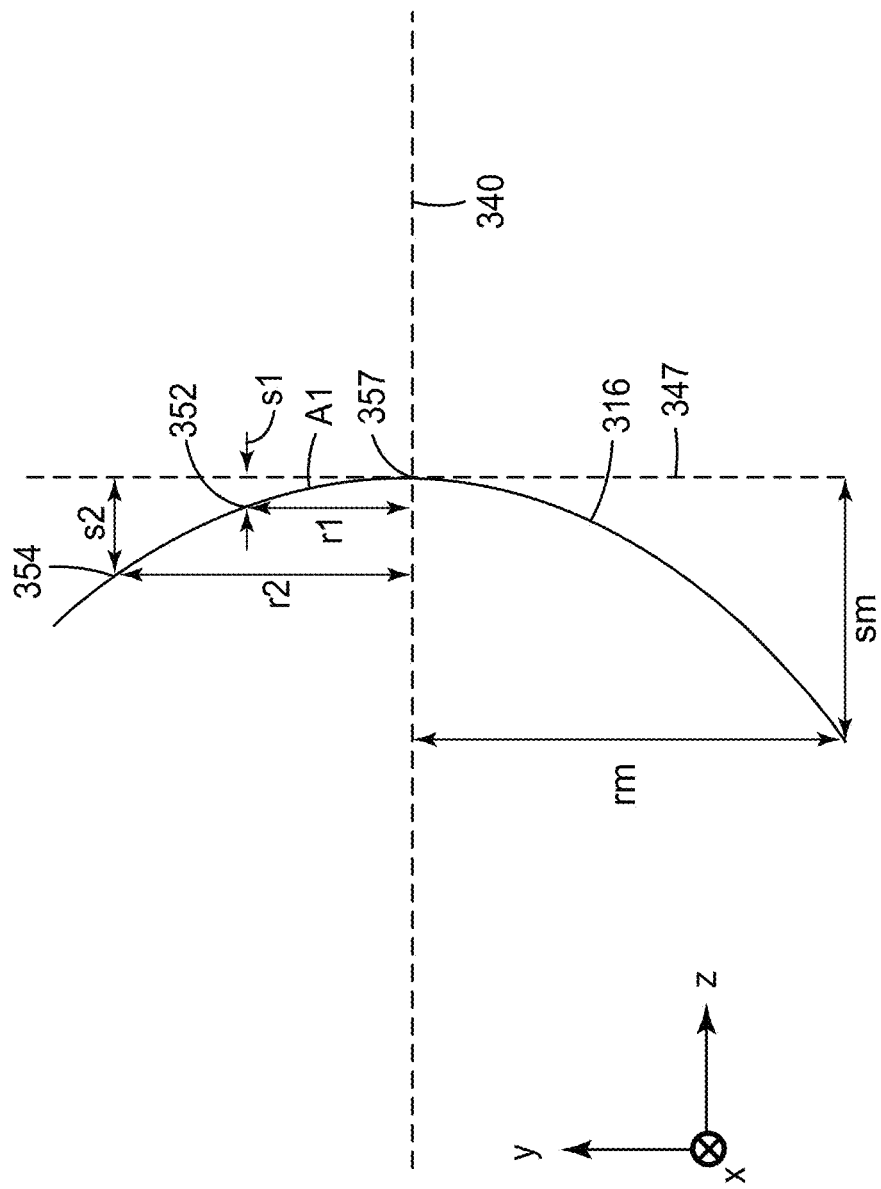
FIG. 3 is a cross-sectional view of a surface of a lens.

A surface may be said to be defined by an equation if the shape of the surface is described by the equation. The description of a surface in terms of sag as a function of radial distance from an optical axis is illustrated in FIG. 3 which is a cross-sectional view of a surface 316, which may be a major surface of any of the lenses, reflective polarizers, or retarders of the present description. Surface 316 includes apex 357 (which is the point on the surface 316 where the optical axis 340 intersects the surface 316) and is curved about two orthogonal axes (e.g., the x-axis and the y-axis). The surface 316 has a first location 352 in an interior portion having a radial distance r1 from an optical axis 340 passing through the apex 357, and a displacement (sag) s1 from a plane 347 (parallel to the x-y plane) perpendicular to the optical axis 340 at the apex 357. Plane 347 is tangent to the surface 316 at the apex 357. The coordinates s1 and r1 define an area A1 of the surface 316 having a radial position from the optical axis 340 of no more than r1 or having a distance along the optical axis from the apex 357 of no more than s1.

In some embodiments, the displacement s1 is related to the radial distance r1 according to a first equation as $s1=f1(r1)$ and the displacement s1 does not depend on the polar coordinate (azimuthal angle) about the optical axis 340, but only depends on the radial distance r1. The surface 316 has a second location 354 in a peripheral portion having a radial distance r2 from the optical axis 340 and a displacement s1 from the plane 347. In some embodiments, the displacement s2 is related to the radial distance r2 according to a second equation as $s2=f2(r2)$. The first and second functions $f1(r)$ and $f2(r)$ are typically chosen so that the surface is continuous and smooth between the interior and peripheral portions. The equations $s1=f1(r1)$ and $s2=f2(r2)$ may take the form of any of the conventional lens equations. Such equations are usually specified by 20 or fewer parameters, and often by 10 or fewer parameters. In some embodiments, each of the first and second equations are specified by 20 or fewer, or by 15 or fewer, or by 10 or fewer parameters. In some embodiments, the first and second equations are different equations and each take the form of an aspheric polynomial sag equation.

An aspheric polynomial sag equation has the general form $$z = \frac{cr^2}{1 + [1-(1+k)c^2r^2]^{1/2}} + Dr^4 + Er^6 + Fr^8 + Gr^{10} + Hr^{12} + Ir^{14} + Jr^{16} + \ldots \quad \text{(Equation 1)}$$

where c, k, D, E, F, G, H, I and J are constants, z, which is referred to as the sag, is the distance along the optical axis from an apex (e.g., distance s1 from apex 357 in FIG. 3) and r is a radial distance from the optical axis (e.g., distance r1 from optical axis 340 in FIG. 3). The first term $$\frac{cr^2}{1+[1-(1+k)c^2r^2]^{1/2}} \quad \text{(Equation 2)}$$

is the conic term, the parameter k may be referred to as the conic constant, and the parameter c is the curvature (inverse of radius of curvature) at the apex. The remaining terms are polynomial in the square of the radial distance r from the optical axis. Any of the optical systems of the present description may include a reflective polarizer, one or more quarter-wave retarders, a partial reflector and a plurality of major surfaces disposed between a display panel and an exit pupil. Any one or more of the reflective polarizer, the one or more quarter-wave retarders, the partial reflector, and the major surfaces may have shapes having an interior portion defined by a first aspheric polynomial sag equation and a peripheral portion defined by a second aspheric polynomial sag equation. In some embodiments, the aspheric polynomial sag equations include terms no higher than the twentieth, or the eighteenth, or the sixteenth power of the radial coordinate. In embodiments where the aspheric polynomial sag equations include terms no higher than the sixteenth power of the radial coordinate, the equations are each defined by 9 parameters: c, k, D, E, F, G, H, I and J. A spherical surface refers to a surface having the shape of a portion of a sphere. An aspherical surface refers to a surface having a shape given by an aspherical lens equation.

In some embodiments, a maximum sag (e.g., the sag sm at the bottom edge of surface 316) divided by a maximum radius (e.g., the radius rm at the bottom edge of surface 316) of a lens or optical element may be at least 0.1, or at least 0.105, or at least 0.15, or at least 0.2, and may be less than 2.0, or less than 1.6, or less than 1.3, or less than 1.0. In some embodiments, the surface has a maximum sag along a major axis (e.g., a horizontal direction) different than a maximum sag along a minor axis (e.g., vertical direction) orthogonal to the major axis in the plane orthogonal to the optical axis. In some embodiments, a surface, or a film, or a lens may have a maximum diameter along a major axis (e.g., maximum distance between points along the edge 241, 241*b* or 241*c* along the x-axis) and a maximum sag along the major axis. A ratio of the maximum sag along the major axis to the maximum diameter along the major axis, may be in a range 0.051 to 1.0, or 0.08 to 0.8, or 0.1 to 0.65, or 0.1 to 0.5, for example. In some embodiments, a surface or a lens may have a maximum diameter along the minor axis (e.g., maximum distance between points along the edge 241, 241*b* or 241*c* along the y-axis) and a maximum sag along the minor axis. A ratio of the maximum sag along the minor axis to the maximum diameter along the minor axis, may be in a range 0.1 to 0.8, or 0.15 to 0.75, or 0.2 to 0.5, for example. In some embodiments, the ratio of the maximum sag along the major axis to the maximum diameter along the major axis is at least 1.01, or at least 1.05, or at least 1.1, or at least 1.2, or at least 1.4 times the ratio of the maximum sag along the minor axis to the maximum diameter along the minor axis. In has been found that films attached to the surface do not have to stretch as much overall to conform to such asymmetric surfaces as to conform to a corresponding symmetric surface (for example, having a sag to diameter ratio equal to the average of the sag to diameter ratios in the vertical and horizontal direction) and this allows improved optical properties (such as, for example, improved extinction ratio of a reflective polarizer on the surface of the lens or improved contrast ratio in the optical system). This can be particularly advantageous for films having anisotropic mechanical properties disposed on the lens when an axis of the film (e.g., pass or block axis of a reflective polarizer film) is aligned with the major or minor axis of the lens.

In some embodiment, a lens has a principle axis as described further elsewhere herein. The principle axis may correspond to optical axis 340. A first maximum sag for such a lens can be defined as a distance between first and second planes orthogonal to the principle axis. The first plane, in this context, is the plane of the first and second planes which passes through a point on the lens farthest from the principle axis. The second plane is the parallel plane furthest from the first plane which still contacts the lens surface. The first direction is a direction along a vector that passes from the point at which the principle axis intersects the first plane to the point where the first plane touches the lens surface. The distance along the first direction from the principle axis to the point where the first plane touches the lens surface is a first radius. A second direction is orthogonal to both the first direction and the first direction. A second direction vector can be defined as parallel to the second direction, passing through the principal axis and passing through the farthest point it can on the lens surface. The second maximum sag can be defined as the distance between two points along the principal axis, the first point lying also on the second plane and the second lying also on the second direction vector. The second direction is along an axis extending from the principle axis to a second point at the edge of the lens. The second maximum sag along the second direction is a maximum distance from the second plane, as measured parallel to the principle axis, to the second point at the edge of the lens. The distance along the second direction from the principle axis to the second point is a second radius. In some embodiments, a lens includes a lens substrate and a film having anisotropic mechanical properties disposed on a major surface of the lens substrate. The lens has a principle axis. The major surface has a first maximum sag at a first radius in a first direction from the principle axis and a second maximum sag at a second radius in a second direction from the principle axis. The first direction is along a first axis orthogonal to the principle axis, and the second direction along a second axis orthogonal to both the principle axis and the first axis. In some embodiments, a first ratio of the first maximum sag to the first radius is at least X times a second ratio of the second maximum sag to the second radius, where X is greater than 1. In some embodiments, X is at least 1.05, or at least 1.1, or at least 1.2, or at least 1.4. In some embodiments, the second ratio is at least 0.1 or at least 0.2. In some embodiments, the film has a film axis aligned in a predetermined way relative to the first axis or the second axis as described further elsewhere herein.

In some embodiments, a major surface in an optical system has a first portion defined by a first equation and a second portion adjacent the first portion and defined by a different second equation. In some embodiments, one or both of the first and second equations are rotationally asymmetric, and in some embodiments, one or both of the first and second equations are rotationally symmetric. In some embodiments, each of the first and second equations is a sag equation including terms polynomial in the square of a radial distance from the optical axis, and in some embodiments, the polynomial terms are of twentieth order or less, or eighteenth order or less, or sixteenth order or less in the radial distance. In some embodiments, the sag equation further includes a conic term (as in Equations 1 and 2).

A lens surface shape (or the shape of a major surface of an optical element such as a reflective polarizer or a partial reflector) can be determined by scanning the surface using a coordinate measuring machine or profilometer. The shape of a first (e.g., a center or interior) portion can be fit to first equation. If the fit is within 5 percent error or the correlation coefficient between the measured shape and the shape determined by the equation is at least 0.95, the shape may be said to be defined by the first equation. Similarly, the shape of a second (e.g., peripheral) portion can be fit to a different second equation. If the fit is within 5 percent error or the correlation coefficient between the measured shape and the shape determined by the equation is at least 0.95, the shape may be said to be defined by the second equation. A fit in a portion of a lens surface (or major surface of an optical element) may be said to be within 5 percent error if the maximum in the portion of the absolute value of the difference in the measured sag minus the fit sag divided by the measured sag times 100 percent is no more than 5 percent throughout the portion. The correlation coefficient between the measured shape and the shape determined by the equation can be determined using at least 100 data points uniformly distributed over the surface of the lens or optical element. In some embodiments, a shape defined by an equation may be fit to the equation within 4 percent error, or within 3 percent error, or within 2 percent error. In some embodiments, a shape defined by an equation may have a correlation coefficient between the measured shape and the shape determined by the equation of at least 0.96, or at least 0.97, or at least 0.98. As is known in the art, the correlation coefficient between two variables, such as a measured sag and a sag determined by an equation, is given as the covariance of the two variables divided by products of the standard deviations of the two variables. The correlation coefficient may be referred to as Pearson's product-moment correlation coefficient or Pearson's r. The square of the correlation coefficient is commonly determined in a least squares fit, which is a fit of data to an equation which minimizes the sum of squared errors.

In some embodiments, a lens may have a free-form surface (for example, second major surface 126 and/or first major surface 114 may be free-form surfaces). A free-form surface is a surface having a shape that cannot be accurately fit to a conventional lens equation. In some embodiments, for at least one major surface of the optical system (e.g., a major surface of a lens, or a reflective polarizer, or a partial reflector), a largest correlation coefficient between any polynomial of degree n, n being greater than zero, fitted to the at least one major surface using a least squares fit is less than 0.95, or less than 0.9. In some embodiments, n is no more than 20, or no more than 18, or no more than 16, or no more than 14. In some embodiments, at least 100 data points are used in the least squares fit. In some embodiments, the at least 100 data points are uniformly distributed over the at least one major surface. In some embodiments, the number of data points used in the least squares fit is larger than the degree n of the polynomial. In some embodiments, at least $n^2$ plus 1 data points are used in the least squares fit. In some embodiments, the number of data points used in the least squares fit is at least $n^2$ plus 1 and at least 100. In some embodiments, the at least one major surface is characterized by a displacement from a plane (e.g., distance in z from the plane 347 in FIG. 3) as a function of Cartesian x and y coordinates in the plane and each polynomial of degree n is a polynomial in x and y. If a surface is described by a polynomial of degree n in x and y, the displacement, z, of the surface from the x-y plane can be written in the form $$z = \sum_{i \geq 0, j \geq 0}^{i+j \leq n} a_{ij} x^i y^j \quad \text{(Equation 3)}$$

Here, i and j are integers, n, which is the degree of the polynomial, is an integer greater than zero, and $a_{ij}$ are constant coefficients. In some embodiments, at least one major surface of an optical system of the present description cannot be accurately described by Equation 3. For example, a least squares fit of the major surface to this equation may give greater than 5 percent error in at least some portions of the surface. In some embodiments, a largest correlation coefficient between any polynomial of the form of Equation 3 fitted to the major surface using a least squares fit is less than 0.95 when n is no more than 20 and when at least 100 data points are used in the least squares fit. In some embodiments, the major surface that cannot be accurately fit to a polynomial is a continuous surface with no sharp or abrupt changes in slope. In some embodiments, the major surface has no points with a radius of curvature of less than 5 mm, or less than 2 mm, or less than 1 mm, or less than 0.5 mm.

In some embodiments, at least one major surface of an optical system of the present description cannot be accurately fit to an aspheric lens equation having 20 or fewer parameters (for example, any fit of the surface shape to an aspheric lens equation having 20 or fewer parameters has greater than 5 percent error in at least some locations on the surface or has a largest correlation coefficient of less than 0.95). In some embodiments, a free-form surface cannot be accurately fit to an aspheric lens equation having 16 or fewer, or 14 or fewer, or 12 or fewer, or 10 or fewer parameters. In some embodiments, a surface of a lens or other optical element may have a free-form shape that is rotationally asymmetric. In some embodiments, a surface of a lens or other optical element may have a free-form shape having a sag that depends on both a radial distance from an optical axis and an azimuthal angle (polar coordinate) about the optical axis. In some embodiments, a surface of a lens or other optical element may have a free-form shape that is asymmetric about all planes containing an optical axis of the lens. In some embodiments, at least one major surface of an optical system of the present description has no surface portion (such as interior first portion 232) that is rotationally symmetric about the optical axis of the optical system. For example, each portion of the major surface may have a curvature that depends on the azimuthal angle about the optical axis. A lens with a free-form surface may made by Computerized Numerical Control (CNC) machining or by molding, for example.

Figure 4:
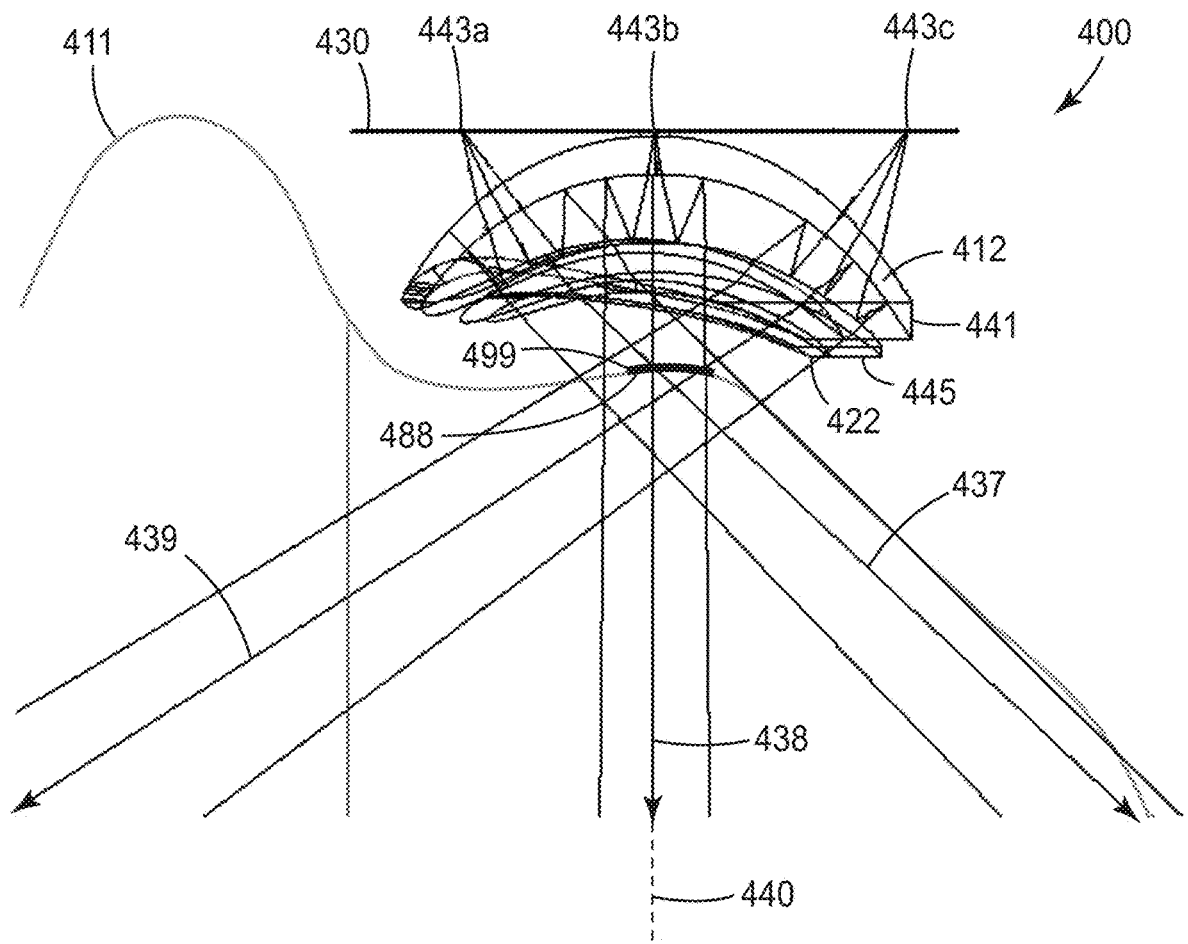
FIG. 4 is a top view of an optical system disposed adjacent an eye of a viewer.

FIG. 4 is a top view of the optical system 400 including first and second lens 412 and 422 and a display panel 430 adapted to provide an image to a viewer. Optical system 400 may correspond to any of the optical systems described elsewhere herein and includes a partial reflector (e.g., disposed on a surface of first lens 412), a reflective polarizer (e.g., disposed on a surface of second lens 422) and a quarter-wave retarder (e.g., disposed on the reflective polarizer). The first and second lenses 412 and 422 have contoured edges 441 and 445 adapted to be placed adjacent a viewer's eye 499. The edges 441 and 445 are shaped so that there is an approximately constant gap (e.g., a gap that varies by less than 50 percent, or less than 25 percent) between optical system 400 and the viewer's face 411, and the edges 441 and 445 may be said to substantially conform to the viewer's face 411. The display panel 430 has pixels 443*a*, 443*b*, and 443*c* emitting light that is focused by the first and second lenses 412 and 422 into the viewer's eye 499. The chief ray 438, which is an image ray, is emitted by the display panel 430 and passes through at least the first lens 412, the partial reflector and the reflective polarizer of optical system 400 without being refracted, and passes through a pupil 488 of the eye 499 of the viewer. The path of chief ray 438 defines an optical axis 440 of optical system 400. The chief ray 437, which is an image ray, of the light from pixel 443 *a* passes to the eye 499 with an incidence angle of 46 degrees. The greater extent of the relief of the first and second lenses 412 and 422 from the viewer's face 411 allows the chief ray 439 from pixel 443*c* to be passed to the eye 499 with a higher incidence angle of 60 degrees.

An advantage of providing a consistent amount of relief of the lens from the face 411 is that ambient light can be effectively blocked with the image while still providing adequate air circulation near the eye 499. Utilizing contoured edges 441 and 445 provides an extended peripheral portion to the surfaces of the lens(es) of the optical systems and this can improve both the field of view and comfort to the user. As described further elsewhere herein, the shape of the peripheral portion is advantageously defined using a different equation than the inner portion of the lens surface or the major surface(s) of the len(es) may be free-form surfaces not accurately described by conventional lens equations.

The size of the optical system of FIG. 4 can be further reduced and the field of view of the optical system can be increased by further curving or extending the peripheral portions of the lenses. The field of view can be even be extended further than allowed by ordinary vision, since facial features would ordinarily limit a portion of the field of view that is accessible with the optical system. This is illustrated in FIGS. 5A-5C.

Figure 5A:
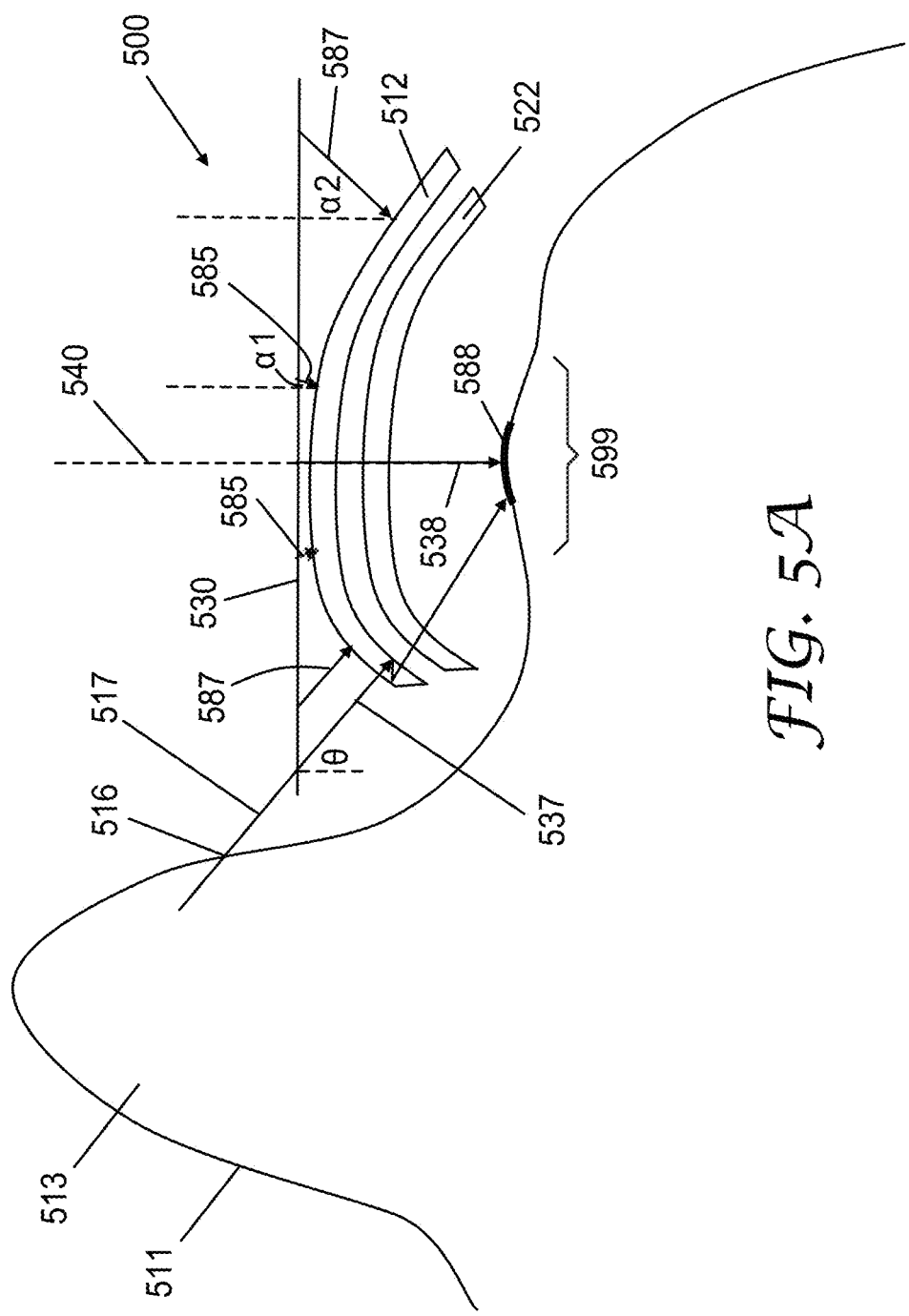
FIGS. 5A-5B are schematic cross-sectional views of an optical system disposed adjacent an eye of a viewer.
Figure 5B:
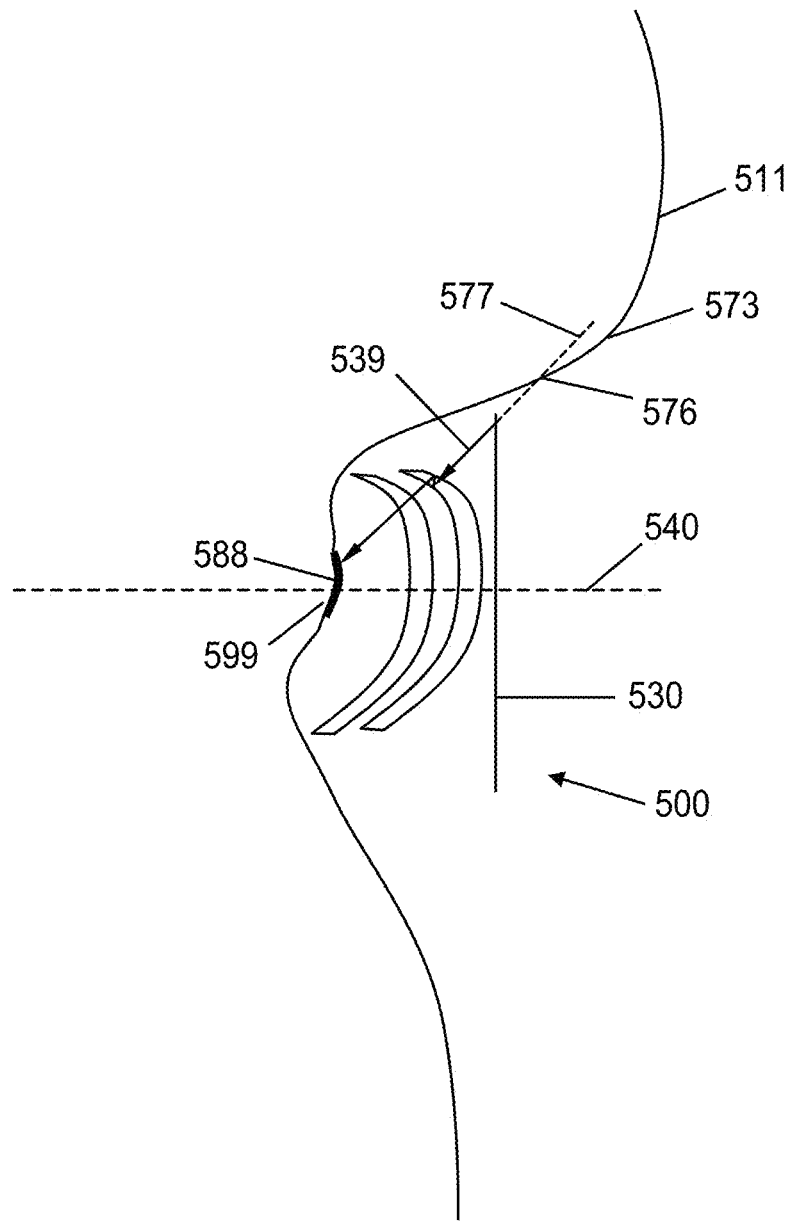
Figure 5C:
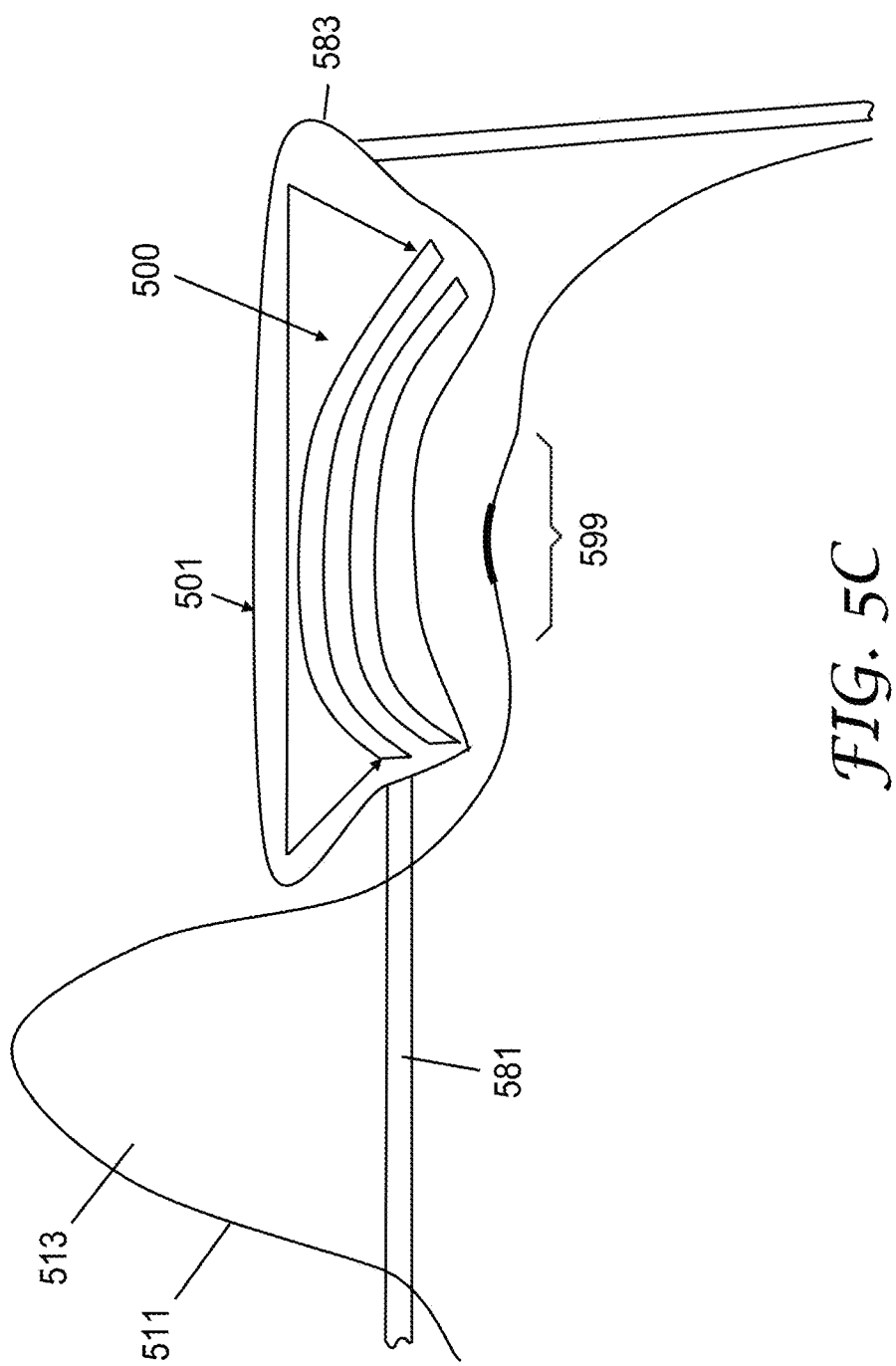
FIG. 5C is a schematic cross-sectional view of a head-mounted display system including the optical system of FIGS. 5A-5B.

FIG. 5A is a schematic top view of an optical system 500 of a head-mounted display (for clarity of illustration the frame of the head-mounted display is not shown in FIGS. 5A-5B; see FIG. 5C). The optical system 500 is positioned adjacent an eye 599 of a viewer 511. The viewer 511 has a nose 513 and the eye 599 has a pupil 588. The optical system 500 includes a display 530 and first and second lenses 512 and 522 and further includes a partial reflector and a reflective polarizer as described elsewhere herein. In alternate embodiments, the optical system 500 may include a single integral optical stack instead of two lenses or may include three or more lenses as described elsewhere herein. The display 530 is configured to emit an image for viewing by the eye 599. First image ray 538 is emitted by the display 530 and propagates along the optical axis 540, passing through at least the first lens 512, the partial reflector and the reflective polarizer without being refracted, and passes through the pupil 588 of the eye 599 of the viewer 511. Second image ray 537 is emitted by the display 530 making an oblique angle θ with the optical axis 540, and passes through the first and second lenses 512 and 522, the partial reflector, the reflective polarizer, and the pupil 588 of the eye 599 of the viewer 511. A straight line 517 coincident with the second image ray 537 intersects the nose 513 of the viewer 511 at an intersection point 516. The display 530 is disposed between the intersection point 516 and the eye 599 of the viewer 511.

FIG. 5A also shows light rays 585 which have a first incident angle α1 with the optical axis 540 and light rays 587 which have a second incident angle α2, which is larger than α1, with the optical axis 540. For each of the first and second incident angles α1 and α2, a plurality of incident light rays pass through the first lens 512, the second lens 522, the partial reflector and the reflective polarizer. The light rays which are incident on the first lens 512 farther away from the optical axis and which are able to pass through both the first and second lenses 512 and 522 to the eye 599 typically have a larger incident angle with the optical axis 540 than light rays incident closer to the optical axis which are able to pass through both the first and second lenses 512 and 522 to the eye 599. Display systems having an increased portion of a light output from a display panel that is transmitted through the first and second lenses are described in U.S. Pat. App. Nos. 62/347,650 and 62/347,652, each filed on Jun. 9, 2016 and each hereby incorporated herein by reference to the extent that it does not contradict the present description.

In some embodiments, an optical system including the first and second lenses 512 and 522 and including a partial reflector and a reflective polarizer is rotationally symmetric about the optical axis 540 with respect to light rays 585 incident on the optical system at the smaller first incident angle α1 but is not rotationally symmetric about the optical axis 540 with respect to light rays 587 with the greater second incident angle α2. The optical system including the first and second lenses 512 and 522 and including a partial reflector and a reflective polarizer is rotationally symmetric at small incident angles since light at these incidence angles passes through the first lens 512, the second lens 522, the partial reflector and the reflective polarizer in a region near the optical axis 540 where the optical system is rotationally symmetric, and the optical system is rotationally asymmetric at large incident angles since light at these incidence angles passes through the first lens 512, the second lens 522, the partial reflector and the reflective polarizer in a region away from the optical axis 540 where the optical system is rotationally asymmetric. In some embodiments, at least one of the first lens 512, the second lens 522, the partial reflector and the reflective polarizer is rotationally symmetric about the optical axis 540 with respect to light rays incident on the optical system and making a smaller first, but not a greater second, incident angle with the optical axis, such that for each of the first and second incident angles, a plurality of incident light rays pass through the first lens 512, the second lens 522, the partial reflector and the reflective polarizer.

A principle axis of a lens is an axis extending from a pupil of a viewer's eye through the lens when the lens is placed adjacent the eye of the viewer and the viewer is looking straight ahead. In some embodiments, the principle axis of a lens is coincident with the optical axis of an optical system including the lens. For example, the optical axis 540 of optical system 500 may be a principle axis for one or both of the first and second lenses 512 and 522.

FIG. 5B is a schematic side view of the user or viewer 511 and the optical system 500 of FIG. 5A. An image ray 539 is emitted by the display 530 making an oblique angle with the optical axis 540, and passes through the lenses, the partial reflector, the reflective polarizer, and the pupil 588 of the eye 599 of the viewer 511. A straight line 577 coincident with the image ray 539 intersects an eyebrow 573 of the viewer 511 at an intersection point 576. The display 530 is disposed between the intersection point 576 and the eye 599 of the viewer 511.

FIG. 5C is a schematic top view of the viewer 511 and the optical system 500 of FIG. 5A showing additional components of the head-mounted display system 501 including a frame 581 for supporting the optical system 500 on the face of the viewer 511 and including a display portion 583 containing the optical system 500. The display portion 583 has a shape contoured to follow the contoured edges of the lenses. The head-mounted display system 501 may further include a display portion and optical system disposed adjacent the viewer's left eye in addition to the display portion 583 and optical system 500 disposed adjacent the viewer's right eye 599.

In the embodiment illustrated in FIGS. 5A-5C, the field of view is larger than what normal vision allows, because the field of view of normal vision is limited by facial features, such as the nose 513 or the eyebrow 573, and the lenses 512 and 522 of the optical system 500 can be placed sufficiently close to the viewer's eye so that the field of view is not limited by facial features. Such a large field of view is useful in head-mounted displays used for virtual reality applications, for example, where the large field of view provides an immersive viewing environment and can provide improved three-dimensional viewing. The lens geometry also allows for a compact head-mounted display with a reduced profile compared to conventional head-mounted displays. As described further elsewhere herein, the large field of view can also provide an enhanced viewing environment for viewers having only one eye.

In some embodiments, an optical system is configured to electronically alter an image content forming an altered image content that is adapted to a contoured edge of the a lens in the optical system. The altered image content is adapted to a contoured edge of the lens by deforming the image such that a boundary of the image is substantially aligned with the contoured edge. The amount of deformation and the shape of the lens(es) in the optical system can be selected such that the image content presented to the viewer is in focus. In some embodiments, custom lens(es) shapes are selected to substantially conform to facial features of a viewer, and the image content presented is altered based, at least in part, on the custom lens(es) shapes.

Figure 6:
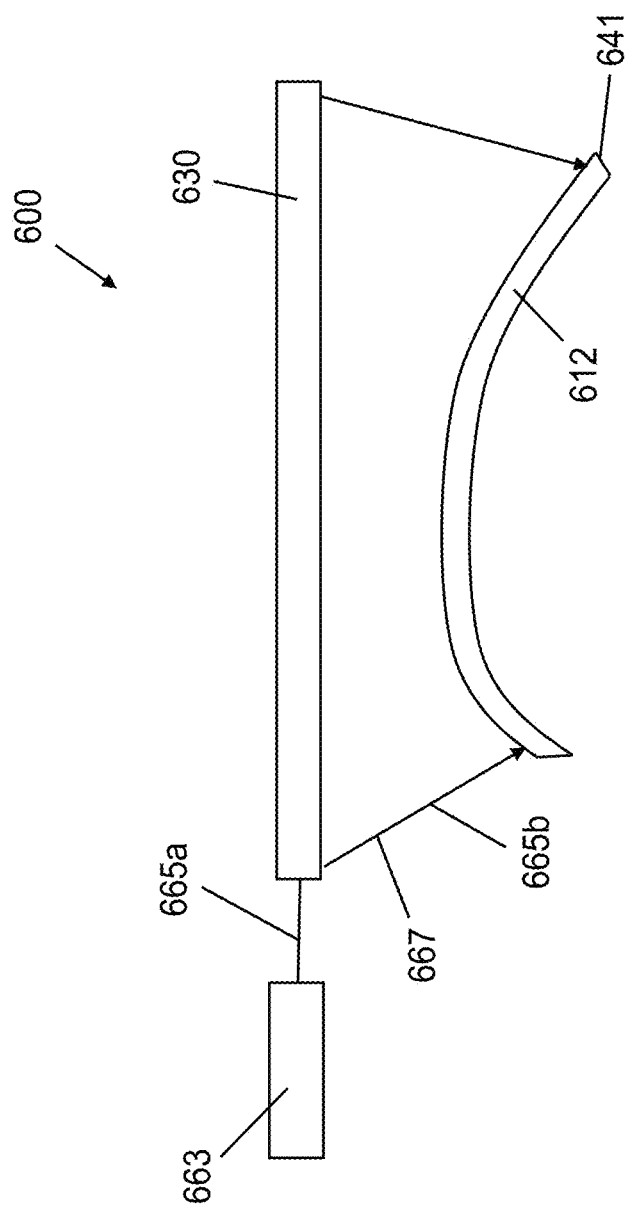
FIG. 6 is a schematic cross-sectional view of an optical system.

FIG. 6 is a schematic cross-sectional view of an optical system 600 including a display panel 630, a lens 612 having a contoured edge 641, and a processor 663. Optical system 600 may correspond to any of the optical systems described elsewhere herein and may include more than one lens, and may include a reflective polarizer and a partial reflector disposed proximate to and spaced apart from one another. Processor 663 is configured electronically alter an image content and provide the altered image content to the display panel 630. The image content may be provided to the processor through a storage device (e.g., a hard drive) or by streaming the content wirelessly, for example. The altered image content in electronic form 665a is provided to the display panel 630 which produces image 667 which includes the altered image content in optical form 665b and which is provided to lens 612.

Figure 7:
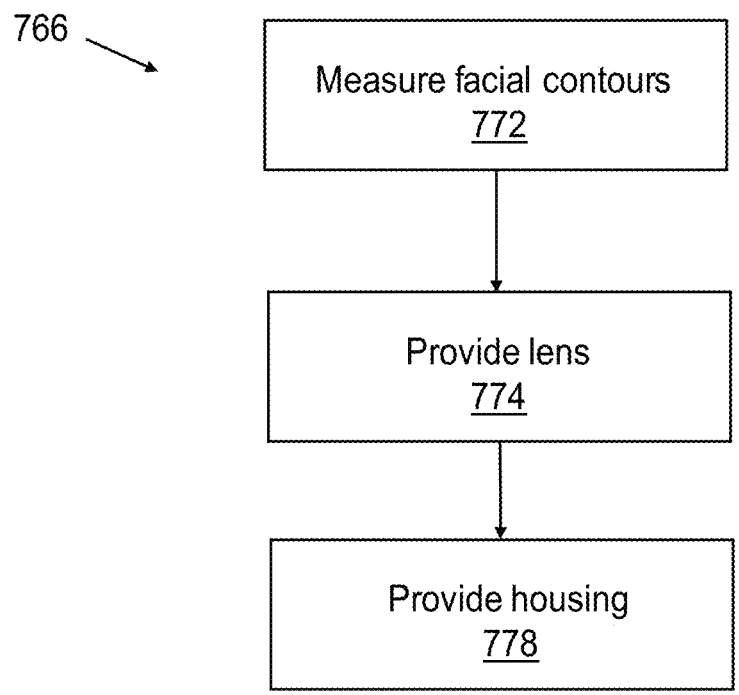
FIG. 7 is a flow chart illustrating a method of making a custom optical system.

FIG. 7 is a flow chart illustrating a method 766 of making a custom optical system for a user or viewer of the optical system. In step 772, the facial contours of the viewer are measured. This can be done, for example, by utilizing a three-dimensional scanner (e.g., computed tomography scanning), or utilizing photographic measurement techniques (e.g., measurements from a series of two-dimensional photographs or measurements from stereoscopic images), or utilizing surface laser scanning techniques, or by making molds of the viewer's face and measuring the geometry of the molds. In step 774, a lens having a contoured edge adapted to be placed adjacent an eye of the viewer and substantially conform to the facial contours of the viewer is provided. The lens can be made by CNC machining, for example. The lens can be made from any suitable material including plastics conventionally used in lenses, such as, for example, polycarbonate. A reflective polarizer may be disposed on a major surface of the lens. The reflective polarizer may be applied to the major surface after the lens is formed, for example. Alternatively, a lens having a reflective polarizer disposed a major surface can be custom ground to conform to the measured facial contours. The optical system may include more than one lens and each of the lenses may have a contoured edge adapted to be placed adjacent an eye of the viewer and substantially conform to the facial contours of the viewer. In step 778, a housing is provided. The housing is shaped to contain the lens and substantially conform to the facial contours of the viewer. For example, the housing may correspond to the housing of head-mounted display system 501 or the display portion 583 depicted in FIG. 5C. The housing may be made by additive manufacturing (e.g., three-dimensional printing), for example, and may be made using any suitable material, such as plastics conventionally used in three-dimension printing. Suitable plastics include, polyamide, alumide, acrylonitrile butadiene styrene (ABS) and polylactic acid (PLA), for example.

In some embodiments, a shaped optical film having anisotropic mechanical properties is provided. The film can be shaped by a forming process, for example, where the film is conformed to the shape of a mold under heat and/or pressure. Suitable forming processes are generally described in U.S. application Ser. No. 14/865,017. In some embodiments, the shaped optical film is a reflective polarizer film including a plurality of alternating polymeric layers with at least some of the layers oriented in a first direction so that the polymer molecules align in the first direction. The first direction corresponds to a transverse direction in films oriented by stretching the film in a transverse direction orthogonal to a tenter machine direction. It has been found that in order to achieve a high sag to length ratio in such films without substantially affecting the optical properties of the film, a tension may be applied to the film along the first direction, which is a length direction of the resulting shaped optical film, so that the film stretches more in the transverse direction than in an orthogonal machine direction in the forming of the film. The film can be significantly stretched in the transverse direction and still substantially preserve the diattenuation of the film, while significant stretching in the machine direction can suppress the diattenuation.

Figure 10A:
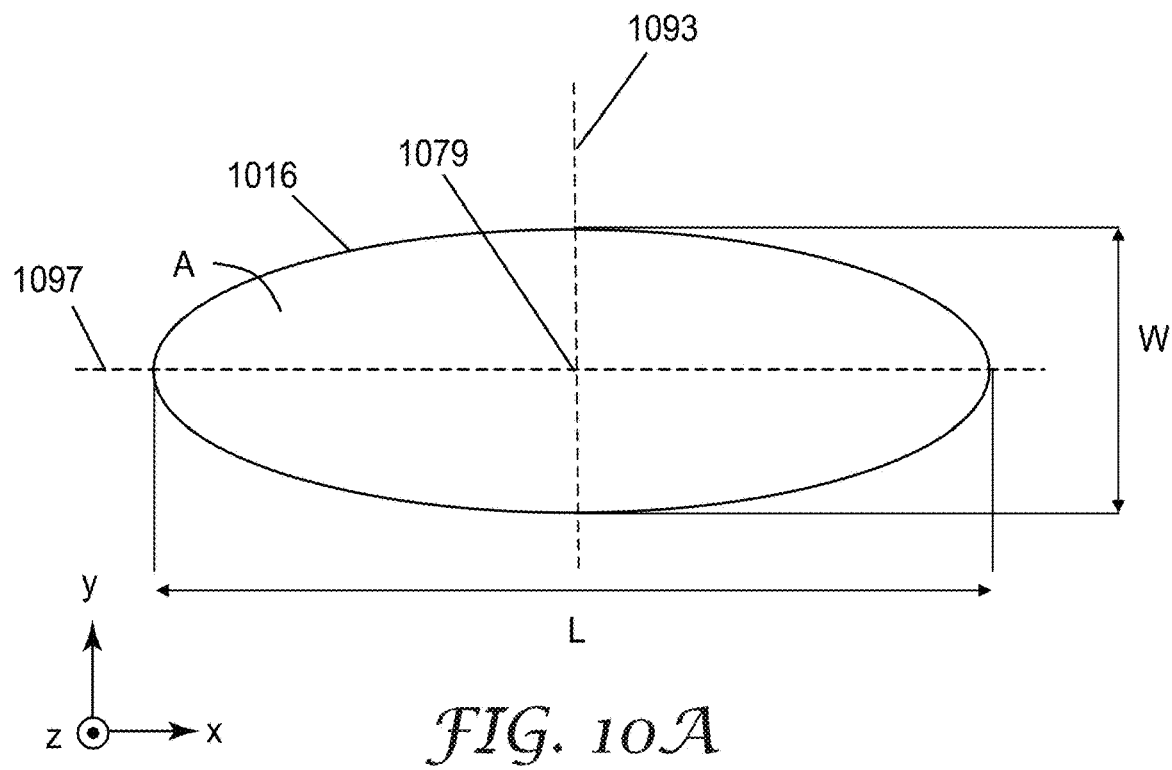
FIG. 10A illustrates a projected area of a shaped optical film.
Figure 10B:
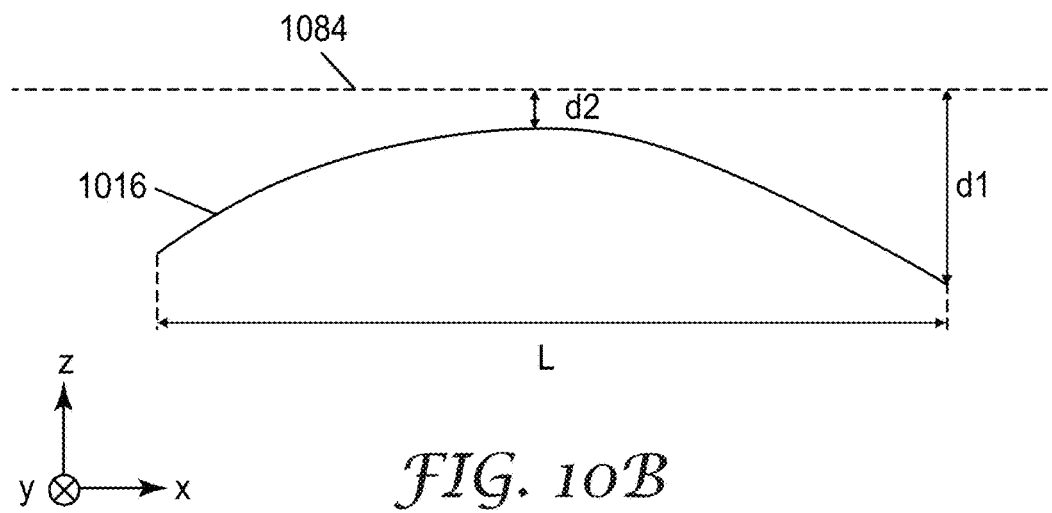
FIGS. 10B-10C are cross-sectional views of a shaped optical film.
Figure 10C:
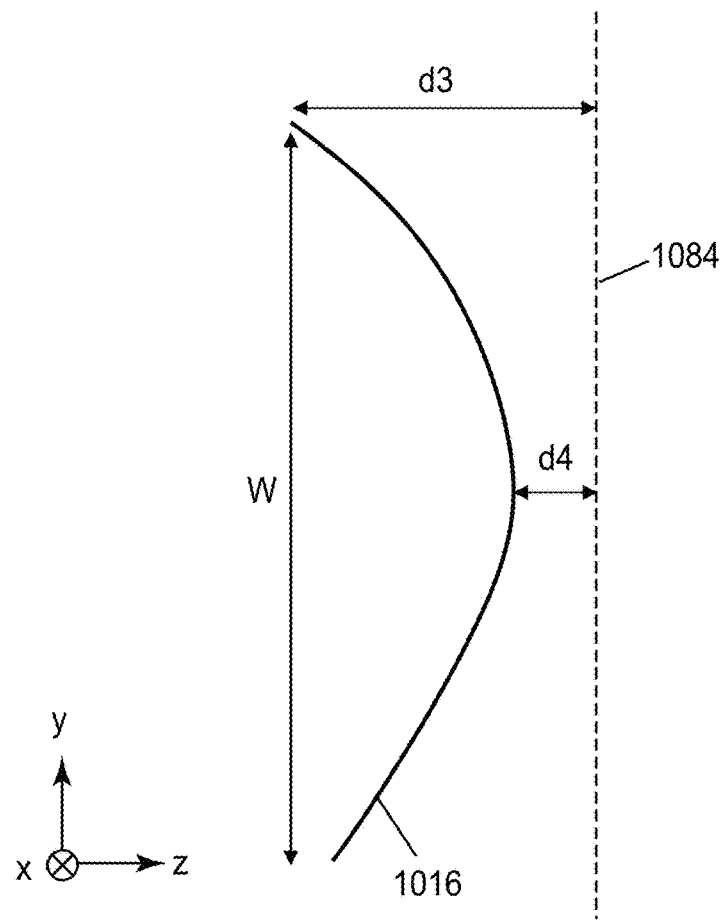

FIG. 10A is projection of a shaped optical film 1016 into a first plane 1084 (see FIGS. 10B-10C) which is parallel to the x-y plane referring to the x-y-z coordinate system of FIG. 10A. The shaped optical film 1016 has a projected area A in the first plane 1084. The shaped optical film 1016 is disposed on one side of the first plane 1084. The projected area A has a centroid 1079, a length L along a first axis 1097 and a width W along an orthogonal second axis 1093. Each of the first axis 1097 and the second axis 1093 is disposed in the first plane 1084 and passes through the centroid 1079. The width W is a minimum length along any line segment in the first plane passing 1084 through the centroid 1079 and connecting opposite points on a boundary of the projected area A. The shaped optical film 1016 has a first maximum sag (d1-d2, referring to FIG. 10B) being a difference in the maximum (d1) and minimum (d2) displacements from the first plane 1084 of the shaped optical film 1016 along the first axis 1097 (parallel to x-axis). The shaped optical film 1016 has a second maximum sag (d3-d4, referring to FIG. 10C) being a difference in the maximum (d3) and minimum (d4) displacements from the first plane 1084 of the shaped optical film 1016 along the second axis 1093 (parallel to y-axis). A first ratio of the first maximum sag (d1-d2) to the length L being at least 1.01 times (or at least 1.05 times, or at least 1.1 times, or at least 1.2 times, or at least 1.4 times) a second ratio (d3-d4) of the second maximum sag to the width W. The second ratio is at least 0.05, or at least 0.1. In some embodiments, the first ratio is in a range of 0.051 to 1, or in a range of 0.08 to 0.8, or in a range of 0.1 to 0.65.

Figure 10D:
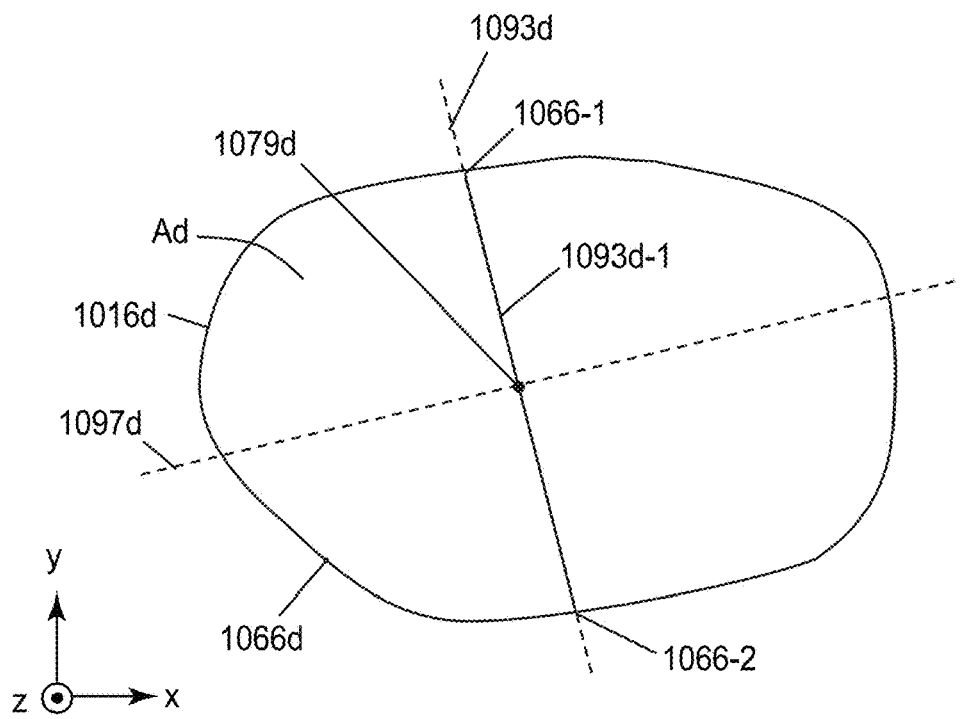
FIG. 10D illustrates a projected area of a shaped optical film.

In some embodiments, the projected area A of the shaped optical film 1016 is the area of an ellipse and the first and second axes 1097 and 1093 are major and minor axes of the ellipse. In other embodiments, the projected area is less symmetric. FIG. 10D illustrates a projected area Ad of a shaped optical film 1016d in a first plane (the plane of the figure). In this case the first and second axes 1097d and 1093d are defined as orthogonal axes in the first plane such that the width along the second axis 1093d is a minimum width. In particular, the minimum distance along any line segment 1093-1 in the first plane which passes through the centroid 1079d of the projected area Ad and connects opposite points 1066-1 and 1066-2 on the boundary 1066d of the projected area Ad is the width along the second axis 1093d. The orthogonal axis within the first plane which passes through the centroid 1079d is then the first axis 1079d.

Figure 10E:
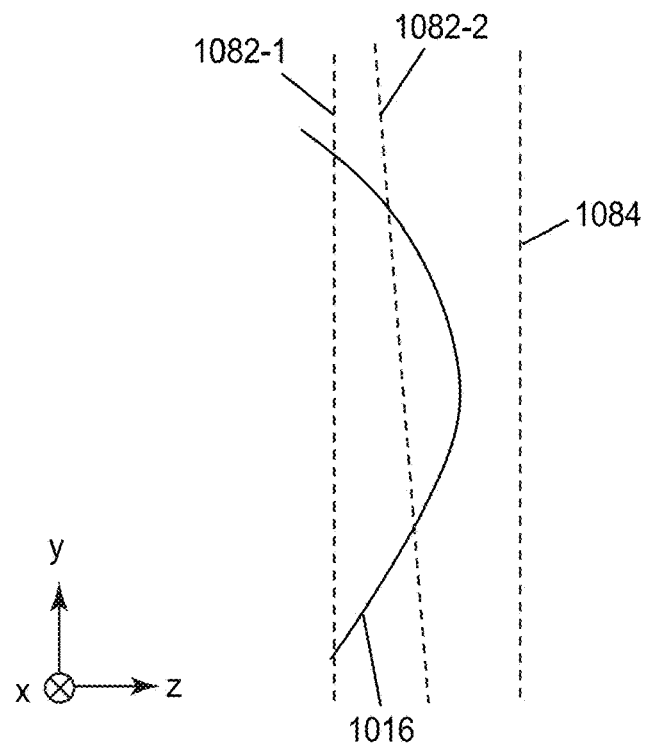
FIG. 10E is a cross-sectional view of a shaped optical film.
Figure 10F:
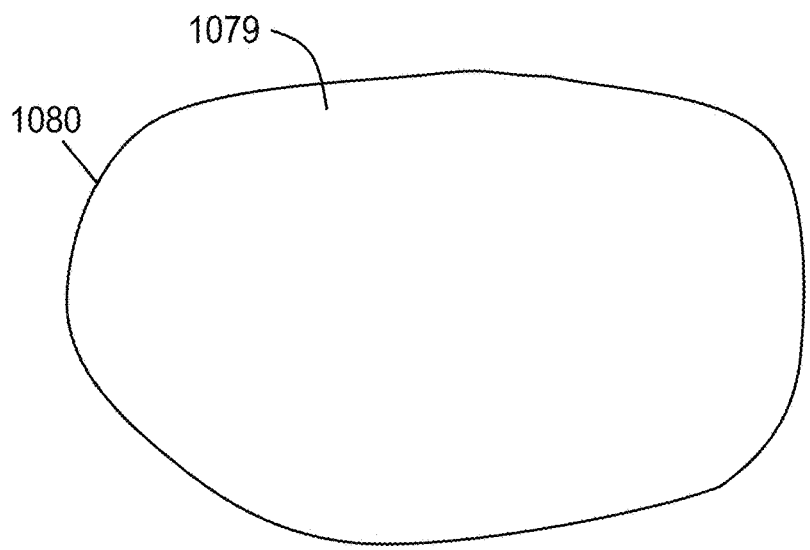
FIG. 10F illustrates an area in a plane bounded by a closed convex curve formed from the intersection of the plane with a shaped optical film.

FIG. 10E is a cross-sectional view of shaped optical film 1016 in the y-z plane. First plane 1084 is shown and two second planes 1082-1 an 1082-2 are shown. FIG. 10F is a plot of a region 1079 of second plane 1082-2 bounded by closed convex curve 1080 which is defined by an intersection of the shaped optical film 1016 with the second plane 1082-2 (the plane of the FIG. 10F). The first plane 1084 is selected so that it is on one side of the shaped optical film 1016 (in the positive z-direction of the shaped optical film 1016 in the figure) and so that a maximum area of any region 1079 of a second plane (e.g., second plane 1082-1 or second plane 1082-2) bound by any closed convex curve (e.g., closed convex curve 1080) defined by an intersection of the shaped optical film 1016 with the second plane (e.g., second plane 1082-1 or second plane 1082-2) is largest when the second plane is parallel to the first plane 1084. For example, the largest closed convex curve formed as the intersection of the shaped optical film 1016 with the second plane 1082-1, which is parallel to the first plane 1084, is larger than the largest closed convex curve formed as the intersection of the shaped optical film 1016 with the second plane 1082-2.

In some embodiments the shaped optical film 1016 as a film axis defined by the anisotropic properties of the film. The film axis may be a pass axis, a block axis, an orientation axis (an axis along which the film was drawn to molecularly orient the layer). The film axis may correspond to film axis 986 and the film axis may be aligned in a predetermined way relative to the first axis or the second axis in the same way that film axis 986 may be aligned relative to major axis 989, an orthogonal minor axis, horizontal axis 997 or vertical axis 993.

In some embodiments, a lens including a lens substrate and the shaped optical film 1016 disposed on a major surface of the lens substrate is provided. The lens may correspond to any of the lenses described elsewhere herein and may be incorporated into any of the optical systems described elsewhere herein. For example, the major surface of the lens substrate may have a geometry characterized by different first and second lens equations where each equation is rotationally symmetric about an optical axis of the optical system including the lens or about a principle axis of the lens.

In some embodiments, a lens including a lens substrate and a film having anisotropic mechanical properties disposed on a major surface of the lens substrate is provided.

The lens has a principle axis (e.g., principle axis 940 or a principle axis through centroid 1079 parallel to the z-axis in FIG. 10A). The major surface has a first maximum sag (e.g., d1-d2) at a first radius (e.g., the distance in the first plane from the centroid 1079 to the point having a displacement d1) in a first direction from the principle axis and a second maximum sag (e.g., d3-d4) at a second radius (e.g., the distance in the first plane from the centroid 1079 to the point having a displacement d3) in a second direction from the principle axis. The first direction is along a first axis 1097 orthogonal to the principle axis and the second direction is along a different second axis 1093 orthogonal to the principle axis. A first ratio of the first maximum sag to the first radius being at least 1.05 times (or at least 1.1 times, or at least 1.2 times, or at least 1.4 times) a second ratio of the second maximum sag to the second radius. The second ratio is at least 0.1 or at least 0.2. In some embodiments, the first ratio is in a range of 0.105 to 2, or 0.15 to 1.6, or 0.2 to 1.3, or 0.2 to 1.0. In some embodiments, the film has a film axis aligned in a predetermined way relative to the first axis or the second axis as described further elsewhere herein. The lens may correspond to any of the lenses described elsewhere herein and may be incorporated into any of the optical systems described elsewhere herein.

The following is a list of exemplary embodiments of the present description.

Embodiment 1 is an optical system comprising:
  a first lens;
  a second lens, at least one of the first and second lenses having optical power in two mutually orthogonal directions;
  a partial reflector having an average optical reflectance of at least 30% for at least one desired wavelength; and
  a reflective polarizer substantially transmitting light having a first polarization state and substantially reflecting light having an orthogonal second polarization state, the optical system having an optical axis, a light ray propagating along the optical axis passes through the first lens, the second lens, the partial reflector and the reflective polarizer without being substantially refracted, wherein at least one major surface of the optical system is rotationally asymmetric about the optical axis.

Embodiment 2 is the optical system of Embodiment 1, wherein at least one of the first and second lenses has no more than two planes of symmetry.

Embodiment 3 is the optical system of Embodiment 1, wherein at least one of the first and second lenses has no more than one plane of symmetry.

Embodiment 4 is the optical system of Embodiment 1, wherein at least one of the first and second lenses has no planes of symmetry.

Embodiment 5 is the optical system of Embodiment 1, wherein the optical system is rotationally symmetric about the optical axis with respect to light rays incident on the optical system and making a smaller first, but not a greater second, incident angle with the optical axis and wherein for each of the first and second incident angles, a plurality of incident light rays pass through the first lens, the second lens, the partial reflector and the reflective polarizer.

Embodiment 6 is an optical system for displaying an image to a viewer comprising:
  a first lens;
  a second lens, at least one of the first and second lenses having optical power in two mutually orthogonal directions;

a partial reflector having an average optical reflectance of at least 30% for at least one desired wavelength; and a reflective polarizer substantially transmitting light having a first polarization state and substantially reflecting light having an orthogonal second polarization state, the optical system having an optical axis, a light ray propagating along the optical axis passes through the first lens, the second lens, the partial reflector and the reflective polarizer without being substantially refracted, wherein at least one of the first lens, the second lens, the partial reflector and the reflective polarizer comprises at least one plane of asymmetry comprising the optical axis.

Embodiment 7 is the optical system of Embodiment 6, wherein at least one of the first and second lenses has no more than two planes of symmetry.

Embodiment 8 is the optical system of Embodiment 6, wherein at least one of the first and second lenses has no more than one plane of symmetry.

Embodiment 9 is the optical system of Embodiment 6, wherein at least one of the first and second lenses has no planes of symmetry.

Embodiment 10 is the optical system of Embodiment 6, wherein the optical system is rotationally symmetric about the optical axis with respect to light rays incident on the optical system and making a smaller first, but not a greater second, incident angle with the optical axis and wherein for each of the first and second incident angles, a plurality of incident light rays pass through the first lens, the second lens, the partial reflector and the reflective polarizer.

Embodiment 11 is an optical system comprising:
a first lens;
a second lens, at least one of the first and second lenses having optical power in two mutually orthogonal directions;
a partial reflector having an average optical reflectance of at least 30% for at least one desired wavelength; and
a reflective polarizer substantially transmitting light having a first polarization state and substantially reflecting light having an orthogonal second polarization state, the optical system having an optical axis, a light ray propagating along the optical axis passing through the first lens, the second lens, the partial reflector and the reflective polarizer without being substantially refracted, wherein the optical system is rotationally symmetric about the optical axis with respect to light rays incident on the optical system and making a smaller first, but not a greater second, incident angle with the optical axis and wherein for each of the first and second incident angles, a plurality of incident light rays pass through the first lens, the second lens, the partial reflector and the reflective polarizer.

Embodiment 12 is the optical system of Embodiment 11, wherein at least one major surface of the optical system is rotationally asymmetric about the optical axis.

Embodiment 13 is the optical system of Embodiment 11, wherein at least one of the first and second lenses has no more than two planes of symmetry.

Embodiment 14 is the optical system of Embodiment 11, wherein at least one of the first and second lenses has no more than one plane of symmetry.

Embodiment 15 is the optical system of Embodiment 11, wherein at least one of the first and second lenses has no planes of symmetry.

Embodiment 16 is the optical system of any one of Embodiments 1 to 15, wherein at least one of the first and second lenses has a contoured edge.

Embodiment 17 is the optical system of Embodiment 16, wherein the optical system is configured to display an image to a viewer and the contoured edge is adapted to be placed adjacent an eye of the viewer and substantially conform to the viewer's face.

Embodiment 18 is the optical system of Embodiment 16, wherein at least one of the first and second lenses have opposing first and second major surfaces defined by respective different first and second equations each rotationally symmetric about the optical axis.

Embodiment 19 is the optical system of Embodiment 18, wherein each of the first and second surfaces have a first portion rotationally symmetric about the optical axis and a second portion adjacent the first portion rotationally asymmetric about the optical axis.

Embodiment 20 is the optical system of Embodiment 19, wherein the first portion is an interior portion and the second portion is a peripheral portion.

Embodiment 21 is the optical system of any one of Embodiments 1 to 15, further comprising a display emitting an image for viewing by an eye of a viewer, wherein a first image ray emitted by the display propagating along the optical axis passes through the first lens, the partial reflector and the reflective polarizer without being substantially refracted and passes through a pupil of the eye of the viewer, and at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

Embodiment 22 is the optical system of Embodiment 21, wherein the optical system is configured to electronically alter an image content forming an altered image content, the altered image content adapted to a contoured edge of the first lens, the image emitted by the display comprising the altered image content.

Embodiment 23 is the optical system of any one of Embodiments 1 to 15, wherein the reflective polarizer is disposed on a major surface of the second lens, the second lens having a major axis, the reflective polarizer having a first axis aligned with the major axis.

Embodiment 24 is the optical system of any one of Embodiments 1 to 15, wherein the reflective polarizer is disposed on a major surface of the second lens, the second lens having a horizontal axis, the reflective polarizer having a first axis aligned with the horizontal axis.

Embodiment 25 is the optical system of any one of Embodiments 1 to 15, wherein the reflective polarizer is disposed on a major surface of the second lens, the second lens having a vertical axis, the reflective polarizer having a first axis aligned with the vertical axis.

Embodiment 26 is the optical system of any one of Embodiments 23 to 25, wherein the first axis is a pass axis.

Embodiment 27 is the optical system of any one of Embodiments 23 to 25, wherein the first axis is a block axis.

Embodiment 28 is the optical system of any one of Embodiments 23 to 25, wherein an angle between the first axis and the major axis is no more than 30 degrees.

Embodiment 29 is the optical system of any one of Embodiments 1 to 15, wherein the partial reflector is disposed on a major surface of the first lens and the reflective polarizer is disposed on a major surface of the second lens.

Embodiment 30 is the optical system of any one of Embodiments 1 to 15, further comprising a quarter-wave retarder disposed between the reflective polarizer and the partial reflector.

Embodiment 31 is the optical system of any one of Embodiments 1 to 15, wherein the at least one desired wavelength comprises at least one visible range.

Embodiment 32 is the optical system of any one of Embodiments 1 to 15, wherein the at least one desired wavelength is a range from 400 nm to 700 nm.

Embodiment 33 is the optical system of any one of Embodiments 1 to 15, wherein at least one of the first and second lenses has a toroidal major surface.

Embodiment 34 is the optical system of any one of Embodiments 1 to 15, wherein the light ray propagating along the optical axis passes through the first lens, the second lens, the partial reflector and the reflective polarizer without being refracted by more than 10 degrees.

Embodiment 35 is the optical system of any one of Embodiments 1 to 15, wherein the light ray propagating along the optical axis passes through the first lens, the second lens, the partial reflector and the reflective polarizer without being refracted by more than 5 degrees.

Embodiment 36 is an optical system comprising:
a first lens;
a partial reflector having an average optical reflectance of at least 30% for at least one desired wavelength; and
a reflective polarizer substantially transmitting light having a first polarization state and substantially reflecting light having an orthogonal second polarization state, the optical system having an optical axis, a light ray propagating along the optical axis passes through the first lens, the partial reflector and the reflective polarizer without being substantially refracted,
the first lens having opposing first and second major surfaces defined by respective different first and second equations, wherein each equation, but not each major surface, is rotationally symmetric about the optical axis.

Embodiment 37 is the optical system of Embodiment 36, wherein each of the first and second surfaces have a first portion rotationally symmetric about the optical axis and a second portion adjacent the first portion rotationally asymmetric about the optical axis.

Embodiment 38 is the optical system of Embodiment 37, wherein the first portion is an interior portion and the second portion is a peripheral portion.

Embodiment 39 is the optical system of Embodiment 36, wherein the optical system is adapted for displaying an image to a viewer and the peripheral portion has a contoured edge adapted to be placed adjacent an eye of the viewer and substantially conform to the viewer's face.

Embodiment 40 is the optical system of Embodiment 36, further comprising a display emitting an image for viewing by an eye of a viewer, wherein a first image ray emitted by the display propagating along the optical axis passes through the first lens, the partial reflector and the reflective polarizer without being substantially refracted and passes through a pupil of the eye of the viewer, and at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

Embodiment 41 is the optical of Embodiment 40, wherein the optical system is configured to electronically alter an image content forming an altered image content, the altered image content adapted to a contoured edge of the first lens, the image emitted by the display comprising the altered image content.

Embodiment 42 is the optical system of Embodiment 36, wherein the partial reflector is disposed on a major surface of the first lens.

Embodiment 43 is the optical system of Embodiment 36, further comprising a second lens, wherein the reflective polarizer is disposed on a major surface of the second lens.

Embodiment 44 is the optical system of Embodiment 36, further comprising a quarter-wave retarder disposed between the reflective polarizer and the partial reflector.

Embodiment 45 is an optical system comprising:
a first lens;
a partial reflector having an average optical reflectance of at least 30% for at least one desired wavelength; and
a reflective polarizer substantially transmitting light having a first polarization state and substantially reflecting light having an orthogonal second polarization state, the optical system having an optical axis, a light ray propagating along the optical axis passes through the first lens, the partial reflector and the reflective polarizer without being substantially refracted,
the first lens having opposing first and second major surfaces, each major surface having a first portion defined by a first equation and a second portion adjacent the first portion defined by a different second equation, the first and second equations for each major surface being rotationally symmetric about the optical axis.

Embodiment 46 is the optical system of Embodiment 45, wherein the first portion is an interior portion and the second portion is a peripheral portion.

Embodiment 47 is the optical system of Embodiment 45, wherein the first lens comprises a minor side surface extending between and connecting the first and second major surfaces.

Embodiment 48 is the optical system of Embodiment 45, wherein each of the first and second equations is a sag equation including terms polynomial in the square of a radial distance from the optical axis, the polynomial terms being of twentieth order or less in the radial distance.

Embodiment 49 is the optical system of Embodiment 48, wherein the sag equation further includes a conic term.

Embodiment 50 is the optical system of Embodiment 45, wherein the optical system is adapted for displaying an image to a viewer and the peripheral portion has a contoured edge adapted to be placed adjacent an eye of the viewer and substantially conform to the viewer's face.

Embodiment 51 is the optical system of Embodiment 45, further comprising a display emitting an image for viewing by an eye of a viewer, wherein a first image ray emitted by the display propagating along the optical axis passes through the first lens, the partial reflector and the reflective polarizer without being substantially refracted and passes through a pupil of the eye of the viewer, and at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

Embodiment 52 is the optical system of Embodiment 51, wherein the optical system is configured to electronically alter an image content forming an altered image content, the altered image content adapted to a contoured edge of the first lens, the image emitted by the display comprising the altered image content.

Embodiment 53 is the optical system of Embodiment 45 being rotationally asymmetric about the optical axis.

Embodiment 54 is the optical system of Embodiment 45, wherein the first lens comprises at least one plane of asymmetry comprising the optical axis.

Embodiment 55 is the optical system of Embodiment 45, wherein the partial reflector is disposed on a major surface of the first lens.

Embodiment 56 is the optical system of Embodiment 45, further comprising a second lens disposed proximate the first lens, wherein the reflective polarizer is disposed on a major surface of the second lens.

Embodiment 57 is the optical system of Embodiment 45, further comprising a quarter-wave retarder disposed between the reflective polarizer and the partial reflector.

Embodiment 58 is an optical system for displaying an image to a viewer, comprising:
a first lens having optical power in two mutually orthogonal directions;
a partial reflector having an average optical reflectance of at least 30% for at least one desired wavelength; and
a reflective polarizer substantially transmitting light having a first polarization state and substantially reflecting light having an orthogonal second polarization state, the first lens having a contoured edge adapted to be placed adjacent an eye of a viewer and substantially conform to the viewer's face.

Embodiment 59 is the optical system of Embodiment 58, further comprising a second lens disposed proximate the first lens, the second lens having a second contoured edge adapted to be placed adjacent the viewer's eye and substantially conform to the viewer's face.

Embodiment 60 is the optical system of Embodiment 59, further comprising a reflective polarizer disposed on a major surface of the second lens.

Embodiment 61 is the optical system of Embodiment 58, further comprising a reflective polarizer disposed on a major surface of the first lens.

Embodiment 62 is the optical system of Embodiment 58, further comprising:
a partial reflector having an average optical reflectance of at least 30% for at least one desired wavelength; and
a reflective polarizer substantially transmitting light having a first polarization state and substantially reflecting light having an orthogonal second polarization state, the optical system having an optical axis, a light ray propagating along the optical axis passes through the first lens, the second lens, the partial reflector and the reflective polarizer without substantially being substantially refracted.

Embodiment 63 is the optical system of Embodiment 62, wherein the optical system is rotationally asymmetric about the optical axis.

Embodiment 64 is the optical system of Embodiment 62, wherein at least one of the first lens, the partial reflector and the reflective polarizer comprises at least one plane of asymmetry comprising the optical axis.

Embodiment 65 is the optical system of Embodiment 62, wherein the first lens has opposing first and second major surfaces defined by respective different first and second equations each rotationally symmetric about the optical axis.

Embodiment 66 is the optical system of Embodiment 65, wherein each of the first and second surfaces have an interior portion rotationally symmetric about the optical axis and a peripheral portion adjacent the interior portion rotationally asymmetric about the optical axis.

Embodiment 67 is the optical system of Embodiment 62 further comprising a display emitting an image for viewing by an eye of a viewer, wherein a first image ray emitted by the display propagating along the optical axis passes through the first lens, the partial reflector and the reflective polarizer without being substantially refracted and passes through a pupil of the eye of the viewer, and
at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

Embodiment 68 is the optical system of Embodiment 67, wherein the optical system is configured to electronically alter an image content forming an altered image content, the altered image content adapted to a contoured edge of the first lens, the image emitted by the display comprising the altered image content.

Embodiment 69 is a head-mounted display system comprising:
a display emitting an image for viewing by an eye of a viewer;
a first lens;
a partial reflector having an average optical reflectance of at least 30% for at least one desired wavelength; and
a reflective polarizer substantially transmitting light having a first polarization state and substantially reflecting light having an orthogonal second polarization state, the optical system having an optical axis,
a first image ray emitted by the display propagating along the optical axis passes through the first lens, the partial reflector and the reflective polarizer without being substantially refracted and passes through a pupil of the eye of the viewer,
at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

Embodiment 70 is the head-mounted display system of Embodiment 69, wherein the facial feature is a nose of the viewer.

Embodiment 71 is the head-mounted display system of Embodiment 69, wherein the facial feature is eye brow of the viewer.

Embodiment 72 is the head-mounted display system of Embodiment 69, wherein the first lens has a contoured edge adapted to be placed adjacent the eye of the viewer and substantially conform to a face of the viewer.

Embodiment 73 is the head-mounted display system of Embodiment 69, wherein the first lens have opposing first and second major surfaces defined by respective different first and second equations each rotationally symmetric about the optical axis.

Embodiment 74 is the head-mounted display system of Embodiment 73, wherein each of the first and second surfaces have an interior portion rotationally symmetric about the optical axis and a peripheral portion adjacent the interior portion rotationally asymmetric about the optical axis.

Embodiment 75 is the head-mounted display system of Embodiment 73, further comprising a second lens disposed proximate the first lens.

Embodiment 76 is the head-mounted display system of Embodiment 75, wherein the partial reflector is disposed on a major surface of the first lens and the reflective polarizer is disposed on a major surface of the second lens.

Embodiment 77 is the head-mounted display system of Embodiment 69 further comprising a quarter-wave retarder disposed between the reflective polarizer and the partial reflector.

Embodiment 78 is the head-mounted display system of Embodiment 69, wherein the display is substantially planar.

Embodiment 79 is the head-mounted display system of Embodiment 69, wherein the display is curved.

Embodiment 80 is the head-mounted display system of Embodiment 69, wherein the display includes a plurality of planar portions disposed at obtuse angles relative to one another.

Embodiment 81 is the head-mounted display of Embodiment 79 being configured to electronically alter an image content forming an altered image content, the altered image content adapted to a contoured edge of the first lens, the image emitted by the display comprising the altered image content.

Embodiment 82 is an optical system comprising:
a first lens;
a partial reflector having an average optical reflectance of at least 30% for at least one desired wavelength; and
a reflective polarizer substantially transmitting light having a first polarization state and substantially reflecting light having an orthogonal second polarization state, the optical system having an optical axis, a light ray propagating along the optical axis passes through the first lens, the partial reflector and the reflective polarizer without being substantially refracted,
wherein for at least one major surface of the optical system, the major surface has no surface portion that is rotationally symmetric about the optical axis.

Embodiment 83 is the optical system of Embodiment 82, wherein the optical system is adapted for displaying an image to a viewer and the peripheral portion has a contoured edge adapted to be placed adjacent an eye of the viewer and substantially conform to the viewer's face.

Embodiment 84 is the optical system of Embodiment 82 further comprising a display emitting an image for viewing by an eye of a viewer, wherein a first image ray emitted by the display propagating along the optical axis passes through the first lens, the partial reflector and the reflective polarizer without being substantially refracted and passes through a pupil of the eye of the viewer, and at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

Embodiment 85 is the optical system of Embodiment 84, wherein the optical system is configured to electronically alter an image content forming an altered image content, the altered image content adapted to a contoured edge of the first lens, the image emitted by the display comprising the altered image content.

Embodiment 86 is the optical system of Embodiment 82, wherein the first lens is rotationally asymmetric about the optical axis.

Embodiment 87 is the optical system of Embodiment 82, wherein at least one of the first lens, the partial reflector and the reflective polarizer comprises at least one plane of asymmetry comprising the optical axis.

Embodiment 88 is the optical system of Embodiment 82, wherein the partial reflector is disposed on a major surface of the first lens.

Embodiment 89 is the optical system of Embodiment 82 further comprising a second lens disposed proximate the first lens, wherein the reflective polarizer is disposed on a major surface of the second lens.

Embodiment 90 is the optical system of Embodiment 82 further comprising a quarter-wave retarder disposed between the reflective polarizer and the partial reflector.

Embodiment 91 is a method of making a custom optical stack, the method comprising: measuring facial contours of the viewer;
providing a first lens, the first lens having a contoured edge adapted to be placed adjacent an eye of the viewer and substantially conform to the measured facial contours of the viewer,
wherein the optical stack comprises a reflective polarizer substantially transmitting light having a first polarization state and substantially reflecting light having an orthogonal second polarization state, the reflective polarizer disposed on a major surface of the first lens.

Embodiment 92 is the method of Embodiment 91, further comprising providing an optical system including the optical stack.

Embodiment 93 is the method of Embodiment 92, wherein the optical system comprises a partial reflector having an average optical reflectance of at least 30% for at least one desired wavelength, the partial reflector disposed proximate to and spaced apart from the reflective polarizer.

Embodiment 94 is the method of Embodiment 93, wherein the optical system further comprises a second lens, the partial reflector disposed on a major surface of the second lens.

Embodiment 95 is the method of Embodiment 92, wherein the optical system further comprises a display configured to emit an image for viewing by the eye of the viewer.

Embodiment 96 is the method of Embodiment 95, wherein the optical system is configured to electronically alter an image content to provide an altered image content, the altered image content adapted to the contoured edge of the first lens, the image emitted by the display comprising the altered image content.

Embodiment 97 is the method of Embodiment 92, further comprising: providing a housing containing the first lens, the housing shaped to substantially conform to the facial contours of the viewer.

Embodiment 98 is the method of Embodiment 97, wherein the providing the housing step comprises additive manufacturing of the housing.

Embodiment 99 is the method of Embodiment 98, wherein additive manufacturing comprises three-dimensional printing.

Embodiment 100 is an optical system comprising:
a first lens;
a partial reflector having an average optical reflectance of at least 30% for at least one desired wavelength; and
a reflective polarizer substantially transmitting light having a first polarization state and substantially reflecting light having an orthogonal second polarization state, wherein for at least one major surface of the optical system, a largest correlation coefficient between any polynomial of degree n, n greater than zero, fitted to the at least one major surface using a least squares fit is less than 0.95.

Embodiment 101 is the optical system of Embodiment 100, wherein at least 100 data points are used in the least squares fit.

Embodiment 102 is the optical system of Embodiment 101, wherein n is no more than 20.

Embodiment 103 is the optical system of Embodiment 101, wherein n is no more than 14.

Embodiment 104 is the optical system of Embodiment 101, wherein the at least 100 data points are uniformly distributed.

Embodiment 105 is the optical system of Embodiment 100, wherein at least $n^2$ plus 1 data points are used in the least squares fit.

Embodiment 106 is the optical system of Embodiment 100, wherein the at least one major surface is characterized by a displacement from a plane as a function of Cartesian x and y coordinates in the plane and each polynomial of degree n is a polynomial in x and y.

Embodiment 107 is the optical system of Embodiment 100, wherein the at least one major surface has no points with a radius of curvature less than 1 mm.

Embodiment 108 is the optical system of Embodiment 100, wherein the at least one major surface is characterized by a displacement from a plane as a function of Cartesian x and y coordinates in the plane and each polynomial of degree n is a polynomial in x and y, wherein n is no more than 20, wherein at least 100 data points are used in the least squares fit, and wherein the at least one major surface has no points with a radius of curvature less than 1 mm.

Embodiment 109 is the optical system of Embodiment 100, wherein the optical system is adapted for displaying an image to a viewer and the peripheral portion has a contoured edge adapted to be placed adjacent an eye of the viewer and substantially conform to the viewer's face.

Embodiment 110 is the optical system of Embodiment 100, further comprising a display emitting an image for viewing by an eye of a viewer, wherein a first image ray emitted by the display propagating along the optical axis passes through the first lens, the partial reflector and the reflective polarizer without being substantially refracted and passes through a pupil of the eye of the viewer, and at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

Embodiment 111 is the optical system of Embodiment 110, wherein the optical system is configured to electronically alter an image content forming an altered image content, the altered image content adapted to a contoured edge of the first lens, the image emitted by the display comprising the altered image content.

Embodiment 112 is the optical system of Embodiment 110, wherein the at least one major surface has no surface portion that is rotationally symmetric about the optical axis.

Embodiment 113 is the optical system of Embodiment 110, wherein the at least one major surface comprises at least one plane of asymmetry comprising the optical axis.

Embodiment 114 is the optical system of Embodiment 100, wherein the partial reflector is disposed on a major surface of the first lens.

Embodiment 115 is the optical system of Embodiment 100, further comprising a second lens disposed proximate the first lens, wherein the reflective polarizer is disposed on a major surface of the second lens.

Embodiment 116 is the optical system of Embodiment 100, further comprising a quarter-wave retarder disposed between the reflective polarizer and the partial reflector.

Embodiment 117 is a lens comprising a reflective polarizer, the reflective polarizer substantially transmitting light having a first polarization state and substantially reflecting light having an orthogonal second polarization state, the reflective polarizer curved about two orthogonal axes, the reflective polarizer not being rotationally symmetric about any axis.

Embodiment 118 is the lens of Embodiment 117, further comprising a lens substrate, the reflective polarizer disposed on a major surface of the lens substrate.

Embodiment 119 is the lens of Embodiment 117 having no more than two planes of symmetry.

Embodiment 120 is the lens of Embodiment 117 having no more than one plane of symmetry.

Embodiment 121 is the lens of Embodiment 117 having no planes of symmetry.

Embodiment 122 is the lens of Embodiment 117 having a contoured edge.

Embodiment 123 is the lens of Embodiment 122, wherein the contoured edge is adapted to be placed adjacent an eye of a viewer and substantially conform to the viewer's face.

Embodiment 124 is the lens of Embodiment 117, further comprising a lens substrate, the reflective polarizer disposed on a major surface of the lens substrate, the lens substrate having a major axis, the reflective polarizer having a first axis aligned in a predetermined way with the major axis.

Embodiment 125 is an optical system comprising:
the lens of Embodiment 117; and
a partial reflector having an average optical reflectance of at least 30% for at least one desired wavelength,
wherein the optical system has an optical axis such that a light ray propagating along the optical axis passes through the lens and the partial reflector without being substantially refracted.

Embodiment 126 is the optical system of Embodiment 125, wherein the lens comprises a lens substrate having opposing first and second major surfaces defined by respective different first and second equations, wherein each equation, but not each major surface, is rotationally symmetric about the optical axis, the reflective polarizer being disposed on one of the first and second major surfaces.

Embodiment 127 is the optical system of Embodiment 125, wherein the lens comprises a lens substrate having opposing first and second major surfaces the reflective polarizer being disposed on one of the first and second major surfaces, each major surface having a first portion defined by a first equation and a second portion adjacent the first portion defined by a different second equation, the first and second equations for each major surface being rotationally symmetric about the optical axis.

Embodiment 128 is the optical system of Embodiment 127, wherein the first portion is an interior portion and the second portion is a peripheral portion.

Embodiment 129 is the lens of Embodiment 117, wherein a largest correlation coefficient between any polynomial of degree n, n greater than zero, fitted to a major surface of the reflective polarizer using a least squares fit is less than 0.95.

Embodiment 130 is the lens of Embodiment 129, wherein at least 100 uniformly distributed data points are used in the least squares fit and n is no more than 14.

Embodiment 131 is a lens comprising a lens substrate having opposing first and second major surfaces and a film having anisotropic mechanical properties disposed on one of the first and second major surfaces, the film having a film axis aligned in a predetermined way with a major axis of the lens substrate, the lens having optical power in two mutually orthogonal directions, the lens not being rotationally symmetric about any axis.

Embodiment 132 is the lens of Embodiment 131, wherein the film is a reflective polarizer and the film axis is a pass axis or a block axis of the reflective polarizer.

Embodiment 133 is the lens of Embodiment 131, wherein an angle between the film axis and the major axis is no more than 30 degrees.

Embodiment 134 is the lens of Embodiment 131, wherein an angle between the film axis and the major axis is in a range of 60 to 90 degrees.

Embodiment 135 is the lens of Embodiment 131, wherein an angle between the film axis and the major axis is in a range of 30 to 60 degrees.

Embodiment 136 is the lens of Embodiment 131, wherein the film axis is an axis along which a mechanical property of the film is a maximum or a minimum.

Embodiment 137 is the lens of Embodiment 131, wherein the first and second major surfaces are defined by respective different first and second equations, wherein each equation, but not each major surface, is rotationally symmetric about an optical axis of the lens.

Embodiment 138 is the optical system of Embodiment 131, wherein each major surface of the first and second major surfaces have a first portion defined by a first equation and a second portion adjacent the first portion defined by a different second equation, the first and second equations for each major surface being rotationally symmetric about an optical axis of the lens.

Embodiment 139 is the optical system of Embodiment 138, wherein the first portion is an interior portion and the second portion is a peripheral portion.

Embodiment 140 is a lens comprising a lens substrate and a film having anisotropic mechanical properties disposed on a major surface of the lens substrate, the lens having a principle axis, the major surface having a first maximum sag at a first radius in a first direction from the principle axis and a second maximum sag at a second radius in a second direction from the principle axis, the first direction along a first axis orthogonal to the principle axis, the second direction along a second axis orthogonal to both the principle axis and the first axis, a first ratio of the first maximum sag to the first radius being at least 1.05 times a second ratio of the second maximum sag to the second radius, the second ratio being at least 0.1, the film having a film axis aligned in a predetermined way relative to the first axis or the second axis.

Embodiment 141 is the lens of Embodiment 140, wherein the film axis is aligned within 30 degrees of the first axis or the second axis.

Embodiment 142 is the lens of Embodiment 140, wherein the film axis is aligned within 20 degrees of the first axis or the second axis.

Embodiment 143 is the lens of Embodiment 140, wherein the film axis is aligned within 10 degrees of the first axis or the second axis.

Embodiment 144 is the shaped optical film of Embodiment 140, wherein the film axis is at an angle in a range of 30 to 60 degrees from the first axis.

Embodiment 145 is the shaped optical film of Embodiment 140, wherein the film axis is at an angle in a range of 35 to 55 degrees from the first axis.

Embodiment 146 is the lens of Embodiment 140, wherein the film is a reflective polarizer and the film axis is a block axis.

Embodiment 147 is the lens of Embodiment 140, wherein the film is a reflective polarizer and the film axis is a pass axis.

Embodiment 148 is the lens of Embodiment 140, wherein the first ratio is at least 1.1 times the second ratio.

Embodiment 149 is the lens of Embodiment 140, wherein the first ratio is at least 1.2 times the second ratio.

Embodiment 150 is the lens of Embodiment 140, wherein the first ratio is at least 1.4 times the second ratio.

Embodiment 151 is the lens of Embodiment 140, wherein the first ratio is in a range of 0.105 to 2.

Embodiment 152 is the lens of Embodiment 140, wherein the first ratio is in a range of 0.15 to 1.6.

Embodiment 153 is the lens of Embodiment 140, wherein the first ratio is in a range of 0.2 to 1.

Embodiment 154 is the lens of Embodiment 140 having a contoured edge adapted to be placed adjacent an eye of the viewer and substantially conform to the viewer's face.

Embodiment 155 is the lens of Embodiment 140, wherein the major surface is a spherical surface.

Embodiment 156 is the lens of Embodiment 140, wherein the major surface an aspherical surface.

Embodiment 157 is the lens of Embodiment 140, wherein the major surface has a first portion defined by a first equation and a second portion adjacent the first portion defined by a different second equation, the first and second equations being rotationally symmetric about an optical axis of the lens.

Embodiment 158 is the lens of Embodiment 157, wherein the first portion is an interior portion and the second portion is a peripheral portion.

Embodiment 159 is the lens of Embodiment 140, wherein the major surface has a first portion rotationally symmetric about an optical axis and a second portion adjacent the first portion rotationally asymmetric about the optical axis.

Embodiment 160 is the lens of Embodiment 157, wherein the first portion is an interior portion and the second portion is a peripheral portion.

Embodiment 161 is the lens of Embodiment 140 having no more than two planes of symmetry.

Embodiment 162 is the lens of Embodiment 140 having no more than one plane of symmetry.

Embodiment 163 is the lens of Embodiment 140 having no planes of symmetry.

Embodiment 164 is an optical system comprising:
the lens of Embodiment 140; and
a partial reflector having an average optical reflectance of at least 30% for at least one desired wavelength,
wherein the optical system has an optical axis such that a light ray propagating along the optical axis passes through the lens and the partial reflector without being substantially refracted.

Embodiment 165 is the optical system of Embodiment 164, wherein the principle axis is coincident with the optical axis.

Embodiment 166 is a shaped optical film having anisotropic mechanical properties, the shaped optical film having a projected area in a first plane, the shaped optical film being disposed on one side of the first plane, the first plane being such that a maximum area of any region of a second plane bound by any closed convex curve defined by an intersection of the shaped optical film with the second plane is largest when the second plane is parallel to the first plane, the projected area having a centroid, a length along a first axis and a width along an orthogonal second axis, each of the first axis and the second axis being disposed in the first plane and passing through the centroid, the width being a minimum length along any line segment in the first plane passing through the centroid and connecting opposite points on a boundary of the projected area, the shaped optical film having a first maximum sag being a difference in the maximum and minimum displacements from the first plane of the shaped optical film along the first axis, the shaped optical film having a second maximum sag being a difference in the maximum and minimum displacements from the first plane of the shaped optical film along the second axis, a first ratio of the first maximum sag to the length being at least 1.01 times a second ratio of the second maximum sag to the width, the second ratio being at least 0.05.

Embodiment 167 is the shaped optical film of Embodiment 166, wherein the shaped optical film has a film axis, the film axis aligned in a predetermined way relative to the first axis or the second axis.

Embodiment 168 is the shaped optical film of Embodiment 167, wherein the film axis is within 30 degrees of the first axis or the second axis.

Embodiment 169 is the shaped optical film of Embodiment 167, wherein the film axis is within 20 degrees of the first axis or the second axis.

Embodiment 170 is the shaped optical film of Embodiment 167, wherein the film axis is at an angle in a range of 30 to 60 degrees from the first axis.

Embodiment 171 is the shaped optical film of Embodiment 167, wherein the film axis is at an angle in a range of 35 to 55 degrees from the first axis.

Embodiment 172 is the shaped optical film of Embodiment 167, wherein the shaped optical film is oriented along the film axis, the film axis being within 30 degrees of the first axis.

Embodiment 173 is the shaped optical film of Embodiment 167, wherein the shaped optical film is oriented along the film axis, the film axis being within 20 degrees of the first axis.

Embodiment 174 is the shaped optical film of 166, wherein the optical film is a reflective polarizer and the film axis is a block axis.

Embodiment 175 is the shaped optical film of Embodiment 167, wherein the optical film is a reflective polarizer and the film axis is a pass axis.

Embodiment 176 is the shaped optical film of Embodiment 166, wherein the first ratio is at least 1.05 times the second ratio.

Embodiment 177 is the shaped optical film of Embodiment 166, wherein the first ratio is at least 1.1 times the second ratio.

Embodiment 178 is the shaped optical film of Embodiment 166, wherein the first ratio is at least 1.2 times the second ratio.

Embodiment 179 is the shaped optical film of Embodiment 166, wherein the first ratio is at least 1.4 times the second ratio.

Embodiment 180 is the shaped optical film of Embodiment 166, wherein the first ratio is in a range of 0.051 to 1.

Embodiment 181 is the shaped optical film of Embodiment 166, wherein the first ratio is in a range of 0.08 to 0.8.

Embodiment 182 is the shaped optical film of Embodiment 166, wherein the first ratio is in a range of 0.1 to 0.65.

Embodiment 183 is a lens comprising a lens substrate and the shaped optical film of Embodiment 166 disposed on a major surface of the lens substrate.

Embodiment 184 is the lens of Embodiment 183 having a contoured edge adapted to be placed adjacent an eye of the viewer and substantially conform to the viewer's face.

Embodiment 185 is the lens of Embodiment 183, wherein the major surface is a spherical surface.

Embodiment 186 is the lens of Embodiment 183, wherein the major surface an aspherical surface.

Embodiment 187 is the lens of Embodiment 183, wherein the major surface has a first portion defined by a first equation and a second portion adjacent the first portion defined by a different second equation, the first and second equations being rotationally symmetric about an optical axis of the lens.

Embodiment 188 is the lens of Embodiment 187, wherein the first portion is an interior portion and the second portion is a peripheral portion.

Embodiment 189 is the lens of Embodiment 183, wherein the major surface has a first portion rotationally symmetric about an optical axis and a second portion adjacent the first portion rotationally asymmetric about the optical axis.

Embodiment 190 is the lens of Embodiment 189, wherein the first portion is an interior portion and the second portion is a peripheral portion.

Embodiment 191 is the lens of Embodiment 183 having no more than two planes of symmetry.

Embodiment 192 is the lens of Embodiment 183 having no more than one plane of symmetry.

Embodiment 193 is the lens of Embodiment 183 having no planes of symmetry.

Embodiment 194 is the lens of Embodiment 183 having a contoured edge adapted to be placed adjacent an eye of a viewer, the lens having a principle axis passing through the eye of the viewer when the lens is positioned adjacent the eye and the viewer looks straight ahead.

Embodiment 195 is the lens of Embodiment 194, wherein the principle axis is orthogonal to the first plane.

Embodiment 196 is an optical system comprising:
the lens of Embodiment 183; and
a partial reflector having an average optical reflectance of at least 30% for at least one desired wavelength,
wherein the optical system has an optical axis such that a light ray propagating along the optical axis passes through the lens and the partial reflector without being substantially refracted.

Embodiment 197 is the optical system of Embodiment 196, wherein the optical axis is orthogonal to the first plane.

Embodiment 198 is an optical system comprising:
the lens of any previous Embodiment directed to a lens; and
a partial reflector having an average optical reflectance of at least 30% for at least one desired wavelength,
wherein the optical system has an optical axis such that a light ray propagating along the optical axis passes through the lens and the partial reflector without being substantially refracted.

EXAMPLES

Example 1

Figure 11:
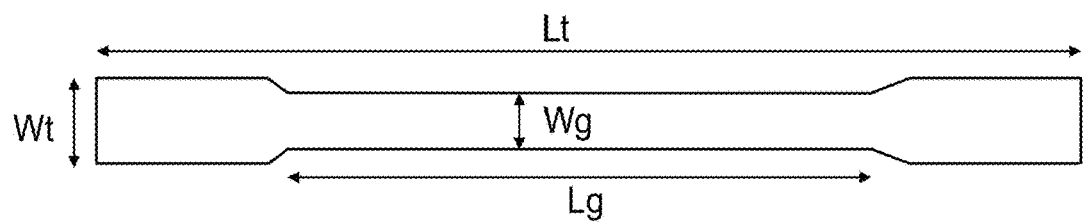
FIG. 11 is a schematic illustration of a sample shape used in the Examples.

A piece of a multi-layered advanced polarized reflecting film (APF, available from 3 M Company) was cut into the shape of a 'dogbone' with a total length, Lt, and width, Wt, of 29" and 2.5", and a gage length, Lg, and width, Wg, of 17" and 2" as shown in FIG. 11. The film had a thickness of 2.5 mils (0.062 mm). The 'dogbone' was oriented so that the long axis of the specimen was oriented parallel to the highest direction of molecular orientation in the film. The ends of the sample were clamped into grips and threaded into a film forming device with the film running under two rotating ½" aluminum rods located 110 mm apart. A tension of approximately 200 N was then applied to stretch the film in the long direction.

A 500 ml round-bottomed flask with an approximate spherical diameter of 106 mm was mounted to a 'labjack' and preheated to a temperature of 180° C. An infrared lamp was then placed over the film and the round-bottomed flask positioned underneath the film between the two rotating rods. The round-bottomed flask was then pushed upwards into the film using the 'labjack' while the film was held under constant tension. As the flask was pushed into the film, the contacting warm film formed to the surface of the flask. The vertical force on the flask increased as the flask was pushed upwards and the penetration stopped when the film achieved an approximately 73° wrap to avoid further danger of breakage of the glass flask. The IR lamp was then removed and the film and flask allowed to cool under ambient conditions.

Figure 12:
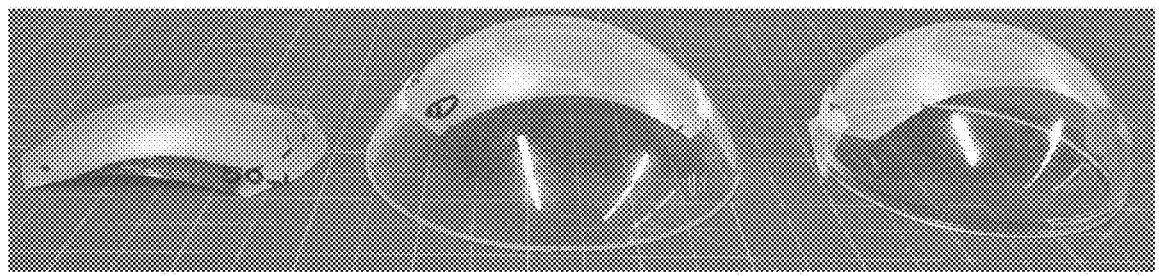
FIG. 12 is a picture of shaped optical films.

Once cooled, the film was removed from the flask and the unformed portions of the film removed. The final formed film had an approximately spherical radius of 53 mm, a contour width of 50 mm and a contour length of 68 mm. The resulting ratios of sag to projected width W and sag to projected length L were 0.119 and 0.166, respectively. The resulting formed film is the film pictured in the left hand side of FIG. 12.

Example 2

A piece of APF film having a thickness of 2.5 mils (0.062 mm) was cut into the shape of a 'dogbone' as in Example 1. The 'dogbone' was oriented so that the long axis of the specimen was oriented parallel to the highest direction of molecular orientation in the film. The ends of the sample were clamped into grips and threaded into a film forming device with the film running under two rotating ½" aluminum rods located 120 mm apart. A tension of approximately 200 N was then applied to stretch the film in the long direction.

A 500 ml round-bottomed flask with an approximate spherical diameter of 106 mm was mounted to a 'labjack' and preheated to a temperature of 180° C. An infrared lamp was then placed over the film and the round-bottomed flask positioned underneath the film between the two rotating rods. The round-bottomed flask was then pushed upwards into the film using the 'labjack' while the film was held under constant tension. As the flask was pushed into the film, the contacting warm film formed to the surface of the flask. The vertical force on the flask increased as the flask was pushed upwards and the penetration stopped when the film achieved an approximately 94° wrap to avoid further danger of breakage of the glass flask. The IR lamp was then removed and the film and flask allowed to cool under ambient conditions.

Once cooled, the film was removed from the flask and the unformed portions of the film removed. The final formed film had an approximately spherical radius of 53 mm, a contour width of 49 mm and a contour length of 87 mm. The resulting ratios of sag to projected width and sag to projected length were 0.117 and 0.217, respectively. The resulting formed film is the film pictured in the center of FIG. 12. The film is disposed on an approximately spherical dome in FIG. 12.

The formed film was placed in an Axometrics scanning polarimeter and the transmitted diattenuation measured as a function of wavelength. The polarimeter measures the intensity of light transmitted through the specimen at a particular wavelength and polarization angle. Light with a polarization axis parallel to the 'pass' orientation largely passes through the APF film whereas light with a polarization axis perpendicular to the 'pass' orientation is largely reflected by the APF film. The diattenuation is defined as:

$$\text{diattenuation} = \frac{T_{max} - T_{min}}{T_{max} + T_{min}}$$

where $T_{max}$ and $T_{min}$ are the maximum and minimum transmitted light intensities divided by the light intensity of the light incident on the specimens. The value of the diattenuation can range from zero for a completely isotropic specimen to unity for a perfect linear polarizer. For lens utilizing curved APF films it is typically desirable to have diattenuation values close to unity. The polarimeter was calibrated in air at a wavelength of 550 nm. The measurements showed no suppression of the diattenuation and instead an increase of 1-2% to values above unity. It is believed that this increase was likely caused by measurement artifacts resulting from the curvature of the formed film.

Example 3

A piece of APF having a thickness of 2.5 mils (0.062 mm) was cut into the shape of a 'dogbone' as in Example 1. The 'dogbone' was oriented so that the long axis of the specimen was oriented parallel to the highest direction of molecular orientation in the film. The ends of the sample were clamped into grips and threaded into a film forming device with the film running under two rotating ½" aluminum rods located 120 mm apart. A tension of approximately 200 N was then applied to stretch the film in the long direction.

A 250 ml round-bottomed flask with an approximate spherical diameter of 84 mm was mounted to a 'labjack' and preheated to a temperature of 180° C. An infrared lamp was then placed over the film and the round-bottomed flask positioned underneath the film between the two rotating rods. The round-bottomed flask was then pushed upwards into the film using the 'labjack' while the film was held under constant tension. As the flask was pushed into the film, the contacting warm film formed to the surface of the flask. The vertical force on the flask increased as the flask was pushed upwards and the penetration stopped when the film achieved an approximately 72° wrap to avoid further danger of breakage of the glass flask. The IR lamp was then removed and the film and flask allowed to cool under ambient conditions.

Once cooled, the film was removed from the flask and the unformed portions of the film removed. The final formed film had an approximately spherical radius of 42 mm, a contour width of 51 mm and a contour length of 85 mm. The resulting ratios of sag to projected width and sag to projected length were 0.156 and 0.276, respectively. The resulting formed film is the film pictured in the right hand side of FIG. 12. The film is disposed on an approximately spherical dome in FIG. 12.

The formed film was placed in an Axometrics scanning polarimeter and the transmitted diattenuation measured as a function of wavelength as in Example 2. The results show no suppression of the diattenuation and instead an increase of 1-2% to values above unity. It is believed that this increase was likely caused by measurement artifacts resulting from the curvature of the formed film.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system comprising:
a first lens;
a partial reflector having an average optical reflectance of at least 30% for at least one desired wavelength; and
a reflective polarizer substantially transmitting light having a first polarization state and substantially reflecting light having an orthogonal second polarization state,
the optical system having an optical axis, a light ray propagating along the optical axis passes through the first lens, the partial reflector and the reflective polarizer without being substantially refracted,
the first lens having opposing first and second major surfaces defined by respective different first and second equations, wherein each equation, but not each major surface, is rotationally symmetric about the optical axis,
wherein each of the first and second major surfaces has a first portion rotationally symmetric about the optical axis and a second portion adjacent the first portion rotationally asymmetric about the optical axis.

2. The optical system of claim 1, wherein the first portion is an interior portion and the second portion is a peripheral portion.

3. The optical system of claim 2, wherein the optical system is adapted for displaying an image to a viewer and the peripheral portion has a contoured edge adapted to be placed adjacent an eye of the viewer and substantially conform to the viewer's face.

4. The optical system of claim 1 further comprising a display emitting an image for viewing by an eye of a viewer, wherein a first image ray emitted by the display propagating along the optical axis passes through the first lens, the partial reflector and the reflective polarizer without being substantially refracted and passes through a pupil of the eye of the viewer, and
at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

5. The optical system of claim 4 being configured to electronically alter an image content forming an altered image content, the altered image content adapted to a contoured edge of the first lens, the image emitted by the display comprising the altered image content.

6. An optical system comprising:
a first lens having optical power in two mutually orthogonal directions;
a partial reflector having an average optical reflectance of at least 30% for at least one desired wavelength; and
a reflective polarizer substantially transmitting light having a first polarization state and substantially reflecting light having an orthogonal second polarization state, the first lens having a contoured edge adapted to be placed adjacent an eye of a viewer and substantially conform to the viewer's face,
wherein the optical system has an optical axis, a light ray propagating along the optical axis passes through the first lens, the partial reflector and the reflective polarizer without being substantially refracted, and wherein the first lens has opposing first and second major surfaces, each of the first and second major surfaces having an interior portion rotationally symmetric about the optical axis and a peripheral portion adjacent the interior portion rotationally asymmetric about the optical axis.

7. The optical system of claim 6, wherein the opposing first and second major surfaces are defined by respective different first and second equations, each equation rotationally symmetric about the optical axis.

8. The optical system of claim 6 further comprising a display emitting an image for viewing by the eye of the viewer, a first image ray emitted by the display propagating along the optical axis passes through the first lens, the partial reflector and the reflective polarizer without being substantially refracted and passes through a pupil of the eye of the viewer, and
at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

9. The optical system of claim 8 being configured to electronically alter an image content forming an altered image content, the altered image content adapted to the contoured edge of the first lens, the image emitted by the display comprising the altered image content.

10. An optical system comprising:
a first lens;
a partial reflector having an average optical reflectance of at least 30% for at least one desired wavelength; and
a reflective polarizer substantially transmitting light having a first polarization state and substantially reflecting light having an orthogonal second polarization state,
the optical system having an optical axis, a light ray propagating along the optical axis passes through the first lens, the partial reflector and the reflective polarizer without being substantially refracted,
wherein for at least one major surface of the optical system, the major surface has no surface portion that is rotationally symmetric about the optical axis.

11. The optical system of claim 10, wherein the optical system is adapted for displaying an image to a viewer and a peripheral portion of the first lens has a contoured edge adapted to be placed adjacent an eye of the viewer and substantially conform to the viewer's face.

12. The optical system of claim 10 further comprising a display emitting an image for viewing by an eye of a viewer, wherein a first image ray emitted by the display propagating along the optical axis passes through the first lens, the partial reflector and the reflective polarizer without being substantially refracted and passes through a pupil of the eye of the viewer, and
at least one second image ray emitted by the display and making a first oblique angle with the optical axis, passes through the first lens, the partial reflector, the reflective polarizer, and passes through the pupil of the eye of the viewer, such that a straight line coincident with the at least one second image ray intersects a facial feature of the viewer at an intersection point, the display disposed between the intersection point and the eye of the viewer.

13. The optical system of claim 12 being configured to electronically alter an image content forming an altered image content, the altered image content adapted to a contoured edge of the first lens, the image emitted by the display comprising the altered image content.

* * * * *